(12) United States Patent
Ogawa et al.

(10) Patent No.: US 8,514,256 B2
(45) Date of Patent: Aug. 20, 2013

(54) DEVICE AND METHOD FOR RECORDING IMAGE TO ELECTRONIC PAPER

(75) Inventors: Satoshi Ogawa, Nagano (JP); Shinichi Kamoshida, Nagano (JP); Shigekazu Yanagisawa, Nagano (JP); Takashi Nitta, Nagano (JP); Yoshiteru Nishimura, Nagano (JP); Katsuhito Gomi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 304 days.

(21) Appl. No.: 13/020,508

(22) Filed: Feb. 3, 2011

(65) Prior Publication Data

US 2011/0187767 A1 Aug. 4, 2011

(30) Foreign Application Priority Data

Feb. 4, 2010 (JP) ................................. 2010-023432
Feb. 17, 2010 (JP) ................................. 2010-032787
Feb. 19, 2010 (JP) ................................. 2010-035050

(51) Int. Cl.
*B41J 2/41* (2006.01)

(52) U.S. Cl.
USPC ....................................................... 347/112

(58) Field of Classification Search
CPC .................................. B41J 2/41; G02B 5/201
USPC ..................... 346/150.1; 347/101, 103, 104, 347/112
See application file for complete search history.

(56) References Cited

U.S. PATENT DOCUMENTS 6,333,754 B1 * 12/2001 Oba et al. ..................... 347/112

FOREIGN PATENT DOCUMENTS

JP 2009-251048 A 10/2009
JP 2009-288290 A 12/2009

* cited by examiner

*Primary Examiner* — An Do
(74) *Attorney, Agent, or Firm* — Global IP Counselors, LLP

(57) ABSTRACT

The quality of an image recorded on electronic paper is improved. Specifically, electronic paper for displaying an image is supplied in a region in which an electric field is generated in the thickness direction of the electronic paper, the electronic paper having charged color particles and being used for displaying an image as a result of charged color particles migrating in the thickness direction. Voltage for generating an electric field in the region is controlled by a voltage control section so that the value of the voltage varies together with time. The quality of an image recorded on electronic paper can thereby be improved.

8 Claims, 31 Drawing Sheets

Fig. 6A

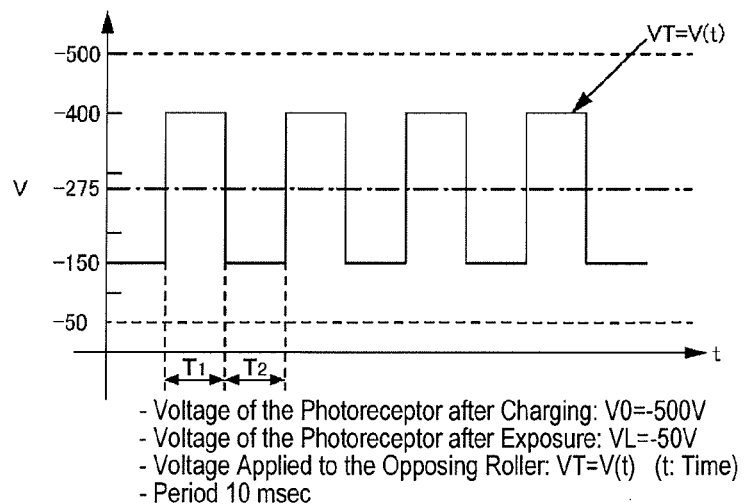

- Voltage of the Photoreceptor after Charging: V0=-500V
- Voltage of the Photoreceptor after Exposure: VL=-50V
- Voltage Applied to the Opposing Roller: VT=V(t)  (t: Time)
- Period 10 msec

Fig. 6B

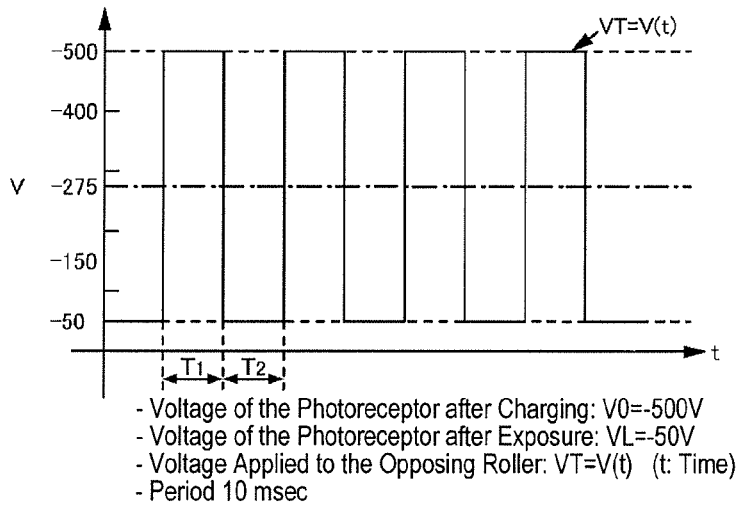

- Voltage of the Photoreceptor after Charging: V0=-500V
- Voltage of the Photoreceptor after Exposure: VL=-50V
- Voltage Applied to the Opposing Roller: VT=V(t)  (t: Time)
- Period 10 msec

Fig. 6C

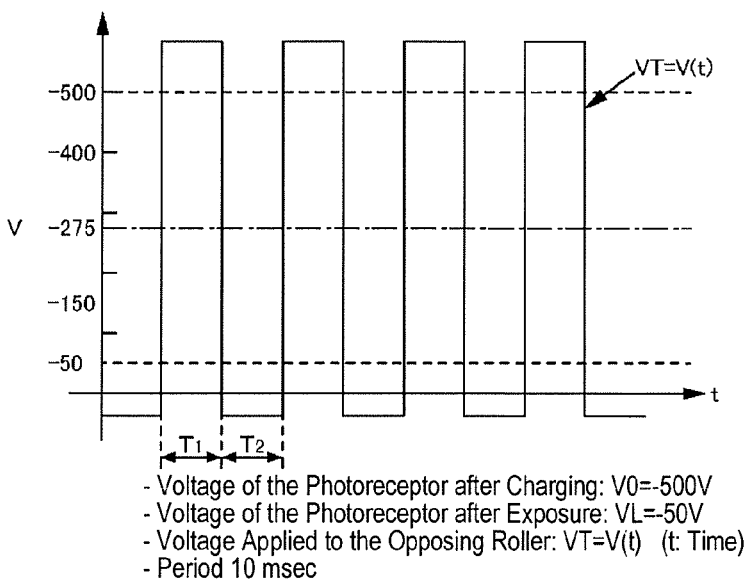

- Voltage of the Photoreceptor after Charging: V0=-500V
- Voltage of the Photoreceptor after Exposure: VL=-50V
- Voltage Applied to the Opposing Roller: VT=V(t)  (t: Time)
- Period 10 msec Fig. 8A
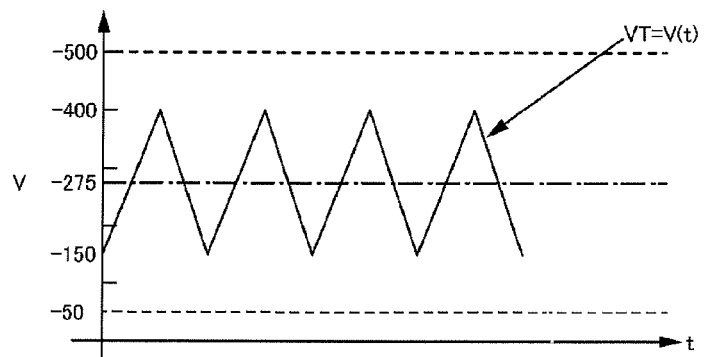
- Voltage of the Photoreceptor after Charging: V0=-500V
- Voltage of the Photoreceptor after Exposure: VL=-50V
- Voltage Applied to the Opposing Roller: VT=V(t)  (t: Time)
- Period 10 msec Fig. 8B
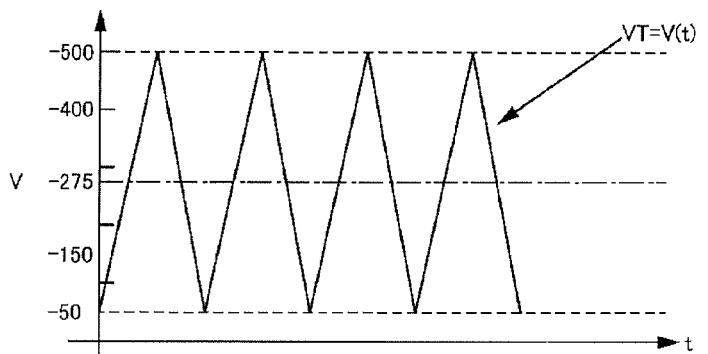
- Voltage of the Photoreceptor after Charging: V0=-500V
- Voltage of the Photoreceptor after Exposure: VL=-50V
- Voltage Applied to the Opposing Roller: VT=V(t)  (t: Time)
- Period 10 msec Fig. 8C
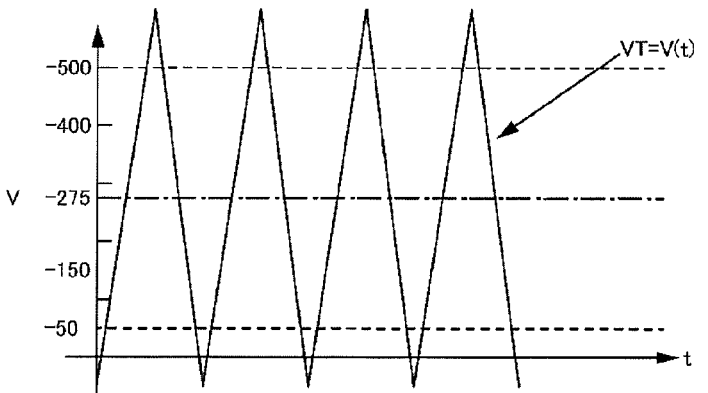
- Voltage of the Photoreceptor after Charging: V0=-500V
- Voltage of the Photoreceptor after Exposure: VL=-50V
- Voltage Applied to the Opposing Roller: VT=V(t)  (t: Time)
- Period 10 msec

- Voltage of the Photoreceptor after Charging: V0=-500V
- Voltage of the Photoreceptor after Exposure: VL=-50V
- Voltage Applied to the Opposing Roller: VT=V(t)  (t: Time)
- Period 10 msec

- Voltage of the Photoreceptor after Charging: V0=-500V
- Voltage of the Photoreceptor after Exposure: VL=-50V
- Voltage Applied to the Opposing Roller: VT=V(t)  (t: Time)
- Period 10 msec

| Center Distance (mm) | Bite (mm) | Nip Width (mm) | Compressive Force (gf/cm²) |
|---|---|---|---|
| 53.8 | 0.2 | 3.3 | 20 |
| 53.3 | 0.7 | 5.0 | 48 |
| 52.8 | 1.2 | 6.5 | 68 |
| 52.3 | 1.7 | 7.6 | 81 |

Fig. 13

- PERIOD 10msec

- PERIOD 10msec

- PERIOD 10msec

- PERIOD 10msec

- PERIOD 10msec

- PERIOD 10msec

- PERIOD 10msec

- PERIOD 10msec

- PERIOD 10msec

DEVICE AND METHOD FOR RECORDING IMAGE TO ELECTRONIC PAPER

CROSS-REFERENCE TO THE RELATED APPLICATIONS

This application claims priority to Japanese Patent Application Nos. 2010-023432, 2010-035050, and 2010-032787 filed on Feb. 4, 2010, Feb. 19, 2010, and Feb. 17, 2010 respectively. The entire disclosure of Japanese Patent Application Nos. 2010-023432, 2010-035050, and 2010-032787is hereby incorporated herein by reference.

BACKGROUND

1. Technical Field

The present invention relates to a device and method for recording an image onto electronic paper.

2. Background Technology

Electronic paper having charged color particles and used for displaying an image when the charged color particles move in the thickness direction is already known. A device for recording an image onto electronic paper controls the position of the charged color particles of the electronic paper by applying an electric field to the electronic paper. An image is thereby recorded to electronic paper (e.g., Patent Document 1).

Patent Document 1: Japanese Laid-open Patent Application No. 2009-251048 is an example of the related art.

SUMMARY

Problems to be Solved by the Invention

With techniques, however, the quality of the image recorded on electronic paper may be poor. The invention was devised in view this problem, and an object thereof is to improve the quality of an image recorded on electronic paper.

Means Used to Solve the Above-Mentioned Problems

The device for recording an image onto electronic paper according to the main aspect for solving the problem described above, is characterized in including an image support body for supporting a latent image; an opposing member that faces the image support body; a supply section for supplying electronic paper in a gap between the image support body and the opposing member, the electronic paper having charged color particles and being used for displaying an image as a result of the charged color particles migrating in a thickness direction; a voltage-applying section for applying a voltage to the opposing member, whereby an electric field is generated along the thickness direction in the gap, and the charged color particles are caused to migrate in the thickness direction, whereby an image corresponding to the latent image is displayed on the electronic paper; and a voltage control section for controlling the voltage applied to the opposing member so that the value of the voltage varies together with time.

In accordance with such a device for recording an image on electronic paper, the image quality to be recorded on electronic paper can be improved.

In the device for recording an image onto electronic paper, the voltage control section may control the voltage so that the value of the voltage varies within a range of V1 or higher and V2 or lower, wherein V1 is the smaller and V2 is the larger of the potential in the image part of the latent image and the potential in the non-image part.

In accordance with such a device for recording an image onto electronic paper, the quality of images recorded to electronic paper can be improved.

In the device for recording an image onto electronic paper, the voltage control section may control the voltage so that the value of the voltage is V1 or V2.

In accordance with such a device for recording an image onto electronic paper, the quality of images recorded to electronic paper can be further improved.

In the device for recording an image onto electronic paper, it is possible for the supply section to supply to the gap the electronic paper on which an image is displayed; the voltage-applying section to apply a voltage to the opposing member whereby an electric field is generated along the thickness direction in the gap, and to cause the charged color particles to migrate in the thickness direction to erase the image displayed on the electronic paper supplied to the gap by the supply section; and the voltage control unit to control the voltage so that the value of the voltage varies so as to include values that are V1 or higher and V2 or lower, and at least a set of values that is greater than V2 or a set of values that is less than V1, wherein V1 is the smaller and V2 is the larger of the potential in the image part of the latent image and the potential in the non-image part.

In accordance with such a device for recording an image onto electronic paper, an image on electronic paper can be suitably erased.

The method for recording an image onto electronic paper, which is the main aspect for solving the problem described above, is characterized in including supplying electronic paper in a gap between an image support body for supporting a latent image and an opposing member facing the image support body, the electronic paper having charged color particles and being used for displaying an image as a result of charged color particles migrating in a thickness direction; and displaying an image that corresponds to the latent image on the electronic paper by applying voltage to the opposing member, controlling the voltage applied to the opposing member so that the value of the voltage varies together with time, generating an electric field in the gap along the thickness direction, and causing the charged color particles to move in the thickness direction.

In accordance with such a method for recording an image onto electronic paper, the quality of images recorded to electronic paper can be improved.

Also, the method for recording an image onto electronic paper is characterized in including an image support body for supporting a latent image; an opposing member that faces the image support body; a conveyance member for conveying electronic paper that has charged color particles and that displays an image as a result of the charged color particles migrating in a thickness direction; a voltage-applying section for applying voltage to the opposing member when the electronic paper is positioned between the image support body and the opposing member, whereby an electric field is generated along the thickness direction in the gap, and the charged color particles are caused to move in the thickness direction, whereby an image corresponding to the latent image is displayed on the electronic paper; and a controller for causing the voltage-applying section to carry out a first process for causing the electronic paper to be conveyed to the conveyance member, causing mutually different locations of the electronic paper to be sequentially fed to the gap, and causing an image corresponding to the latent image to be sequentially displayed in the location fed to the gap; and for causing the voltage-applying section to carry out a second process for causing the electronic paper to be conveyed to the conveyance member, causing the locations having just come out from the gap to again be sequentially fed to the gap, and causing the image corresponding to the latent image in the location fed to the gap to again be sequentially displayed, wherein the controller controls the voltage applied to the opposing member so that the value of the voltage is a constant value when the first process has been carried out, and controls the voltage so that the value of the voltage varies together with time when the second process is carried out.

In accordance with such a device for recording an image onto electronic paper, it is possible to display an image on electronic paper by causing charged color particles to migrate in the thickness direction when a first process is carried out, to move charged color particles positioned in unsuitable positions to suitable positions by varying the strength of the electric field when the second process is carried out, and to display a sharp image on electronic paper. The image quality recorded on electronic paper can thereby be improved.

In the device for recording an image onto electronic paper, the image support body may support a latent image by having a region charged at a first potential and a region charged at a second potential that is greater that the first potential; and the controller may control the voltage applied to the opposing member so that the value of the voltage is a fixed value in a range that is greater than the first potential and less than the second potential when the first process is carried out, and control the voltage so that the value of the voltage varies together with time in a range that is greater than the first potential and less than the second potential when the second process is carried out.

In accordance with such a device for recording an image onto electronic paper, it is possible to move charged color particles positioned in unsuitable positions to suitable positions and to display a sharper image on electronic paper by varying the strength of the electric field to change the magnitude of force without changing the direction of force exerted on the charged color particles in the thickness direction when the second process is carried out. The image quality recorded on electronic paper can thereby be improved.

In the device for recording an image onto electronic paper, the image support body may support a latent image by having a region charged at a first potential and a region charged at a second potential that is greater that the first potential; and the controller may control the voltage applied to the opposing member so that the value of the voltage is a fixed value in a range that is greater than the first potential and less than the second potential when the first process is carried out, and control the voltage so that the value of the voltage varies together with time, and so that the value of the voltage becomes a value that is less than the first potential at a minimum value and becomes a value that is greater than the second potential at a maximum value when the second process is carried out.

In accordance with such a device for recording an image onto electronic paper, it is possible to move charged color particles positioned in unsuitable positions to suitable positions and to display a sharper image on electronic paper by varying the strength of the electric field to change the magnitude of force without changing the direction of force exerted on the charged color particles in the thickness direction when the second process is carried out. The image quality recorded on electronic paper can thereby be improved.

BRIEF DESCRIPTION OF THE DRAWINGS

FIG. 6A is a view showing the voltage applied to the opposing roller 52 during image recording;

FIG. 6B is a view showing another example of the voltage applied to the opposing roller 52 during image recording;

FIG. 6C is a view showing the voltage applied to the opposing roller 52 during image erasure;

FIGS. 8A to 8C are views showing another example (triangular wave) of the voltage applied to the opposing roller 52;

FIG. 13 is a table showing the relationship between the center distance between the first photoreceptor 20a and the first opposing roller 52a or the center distance between the second photoreceptor 20b and the second opposing roller 52b, and the pressure-contact force and the nip width;

DETAILED DESCRIPTION OF EXEMPLARY EMBODIMENTS

Configuration examples of an image recording device for recording an image on electronic paper are described below. The image recording device can be used as a device dedicated to recording images that is provided with a function for recording images on electronic paper; or can be used as an image recording and erasing device provided with two functions: a function for recording an image on electronic paper and a function for erasing an image on electronic paper. First, the configuration of electronic paper will be described prior to a description of the image recording device. The configuration of the image recording device will be described thereafter.

Configuration Example of Electronic Paper

Figure 1:
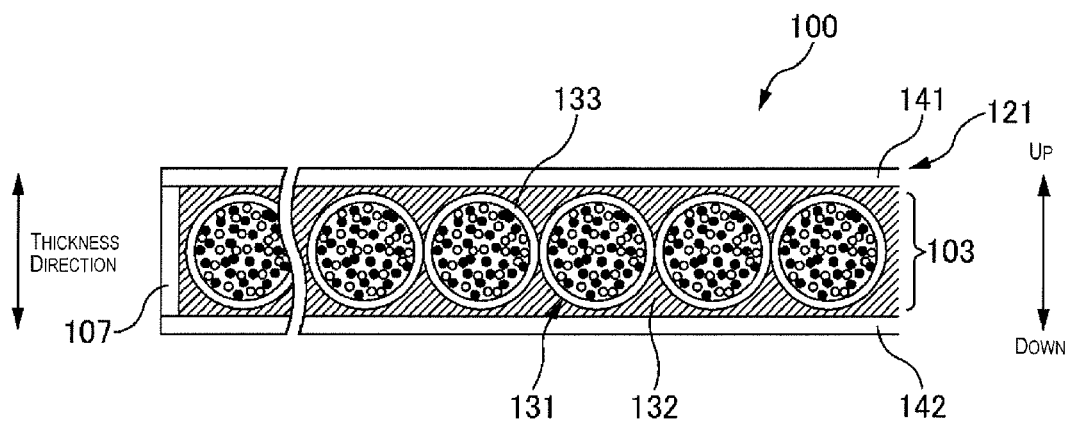
FIG. 1 is a cross-sectional view schematically showing the configuration of electronic paper 100.
Figure 2:
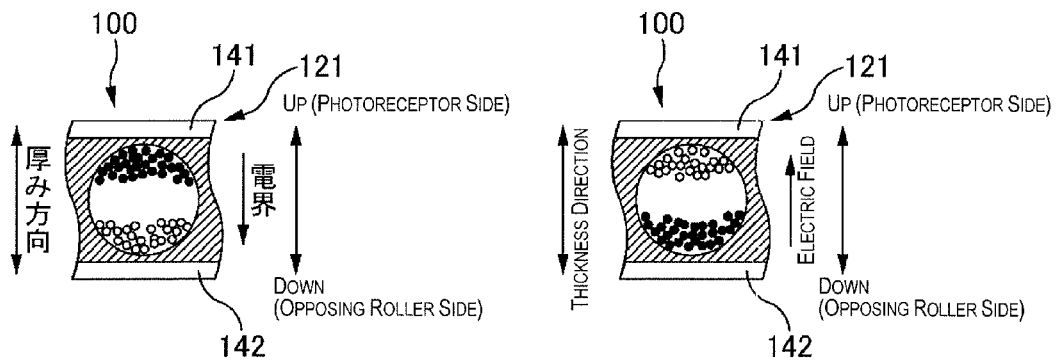
FIG. 2 is a schematic view showing the state of charged color particles in the image location and the non-image location.

A configuration of the electronic paper will be described with reference to FIGS. 1 and 2. FIG. 1 is a cross-sectional view schematically showing the configuration of electronic paper 100. FIG. 2 is a schematic view showing the state of charged color particles in the image location and the non-image location.

The electronic paper 100 has charged color particles and displays an image when the charged color particles move in the thickness direction. In other words, the electronic paper 100 displays images using electrophoresis of colored electrophoretic particles.

The electronic paper 100 according to the present embodiment has a display layer 103, an upper insulating layer 141 provided to the top surface of the display layer 103, a lower insulating layer 142 provided to the bottom surface of the display layer 103, and a seal section 107, as shown in FIG. 1.

In the electronic paper 100, the upper insulating layer 141 constitutes a display surface 121, and images can be perceived by viewing the display layer 103 via the upper insulating layer 141. Electronic paper 100 may or may not have flexibility, but the electronic paper 100 of the present embodiment is flexible.

The display layer 103 has a binder 132 and a microcapsule 131 for accommodating positively charged white particles and negatively charged black particles as examples of the charged color particles. A plurality of the microcapsules 131 is configured so as to be bound (held in place) by the binder 132. The plurality of microcapsules 131 is arranged in a single layer (in single units without overlapping in the thickness direction) so to be aligned in the horizontal and vertical directions between the upper insulating layer 141 and the lower insulating layer 142.

The microcapsules 131 having a capsule main body 133 as a shell, and the interior thereof (interior space) is filled (sealed) with an electrophoretic liquid dispersion. The electrophoretic liquid dispersion filled into the capsule main body 133 has positively charged white particles and negatively charged black particles dispersed (suspended) in a liquid phase dispersion medium. The positively charged white particles and negatively charged black particles can be dispersed in the liquid phase dispersion medium by the paint shaker method, ball milling, media milling, ultrasonic dispersion, stirring and dispersion, and the like, or by a combination of two or more of these methods.

The positively charged white particles are white electrophoretic particles that have been positively charged, and the negatively charged black particles are black electrophoretic particles that have been negatively charged. It is thus possible to carry out black-and-white display on the electronic paper 100 by using the positively charged white particles and the negatively charged black particles.

In the present embodiment, the positively charged white particles have a lower charge level than the negatively charged black particles (the positively charged white particles are slightly charged).

The positively charged white particles and the negatively charged black particles are not particularly limited, and any particles may be used as long as the particles have an electric charge. However, at least one type selected from pigment particles, resin particles, or a composite of these particles may be advantageously used.

Examples of the pigment constituting the pigment particles include aniline black, carbon black, titanium black, and other black pigments; titanium oxide, antimony oxide, and other white pigments; as well as other pigments, and these may used alone or in a combination of two or more. Among these, titanium black is advantageously used as the negatively charged black particles, and titanium oxide is advantageously used as the positively charged white particles (these are used in the present embodiment).

Examples of the resin material constituting the resin particles include acrylic resin, urethane resin, urea resin, epoxy resin, polystyrene, and polyester, and these may be used along or in a combination of two or more.

Examples of the composite particles include pigment particles whose surface has been coated with a resin material or another pigment; resin particles whose surface has been coated with a pigment; and particles composed of a mixture in which pigment and resin particles have been mixed together in a suitable composition ratio. An example of particles in which the surfaces of pigment particles have been coated with another pigment include titanium oxide particles whose surface has been coated with silicon oxide or aluminum oxide.

Smaller variations of the positively charged white particles and the negatively charged black particles are advantageously used when dispersibility in a liquid-phase dispersion medium is considered. Specifically, the average particle diameter is preferably about 10 to 500 nm, and more preferably about 20 to 300 nm. Aggregation of the positively charged white particles and the negatively charged black particles, and precipitation of the positively charged white particles and the negatively charged black particles can be prevented; and the dispersed state of the positively charged white particles and the negatively charged black particles in the liquid phase dispersion medium can be maintained by setting the average particle diameter of the positively charged white particles and the negatively charged black particles in the above-stated range.

An image is displayed when such positively charged white particles and the negatively charged black particles move in the thickness direction of the electronic paper 100 inside the microcapsule 131.

Specifically, and as described in detail below, particle movement is controlled so that the negatively charged black particles migrate to the upper insulating layer 141 (display surface 121) side in the thickness direction and the positively charged white particles migrate to the lower insulating layer 142 side (see the left diagram of FIG. 2) in the desired display locations on the electronic paper 100 (i.e., the black image part); and the positively charged white particles migrate to the upper insulating layer 141 (display surface 121) side in the thickness direction and the negatively charged black particles migrate to the lower insulating layer 142 side (see the right diagram of FIG. 2) in the locations where display of an image is not desired (i.e., the white image part (white background part)). In this manner, black-and-white display on the electronic paper 100 is carried out. The image recording device 1 controls particle movement by generating an electric field along the thickness direction and controlling the orientation of the electric field so that the orientation of the electric field in the former locations is downward (the direction facing from the upper insulating layer 141 toward the lower insulating layer 142; see the left diagram in FIG. 2), and the orientation of the electric field in the latter locations is upward (the direction facing from the lower insulating layer 142 toward the upper insulating layer 141; see the right diagram in FIG. 2).

The specific weight of the positively charged white particles and the negatively charged black particles is preferably set so as to be substantially equal to the specific weight of the liquid phase dispersion medium. The positively charged white particles and the negatively charged black particles can thereby be kept in a fixed position for a long period of time in the liquid phase dispersion medium, even after being affected by the electric field.

The binder 132 is provided for, e.g., the purpose of joining the upper insulating layer 141 and the lower insulating layer 142 together; the purpose of securing the microcapsules 131 between the upper insulating layer 141 and the lower insulating layer 142; and other purposes. Preferably used as the binder 132 is a resin material having excellent insulating properties and excellent affinity (adhesion) with the upper insulating layer 141, lower insulating layer 142, and capsule main body 133.

The upper insulating layer 141 and the lower insulating layer 142 arranged in an opposing configuration so as to sandwich the display layer 103 therebetween are composed of sheet-shaped (flat plate-shaped) members having insulating properties. Such an upper insulating layer 141 and lower insulating layer 142 have a function for protecting the display layer 103 (microcapsule 131).

The upper insulating layer 141 has optical transparency, i.e., is substantially transparent (no-color transparency, colored transparency, or semi-transparent) in order to constitute the display surface 121. The state of the display layer 103 (the state of the positively charged white particles and the negatively charged black particles in the microcapsules 131), i.e., the image (information) displayed on the electronic paper 100 can thereby be recognized by viewing from the display surface 121 side. On the other hand, the lower insulating layer 142 may or may not have optical transparency as does the upper insulating layer 141 (in the present embodiment, the lower insulating layer 142 is essentially nontransparent).

The seal section 107 prevents moisture from entering into the electronic paper 100, and reduces degradation of the display performance of the electronic paper 100. The seal section 107 is provided along the edge portions between the upper insulating layer 141 and the lower insulating layer 142. The display layer 103 is sealed in an airtight fashion by the seal section 107.

(Embodiment 1)

<<<Configuration Example of the Image Recording Device 1>>>

Figure 3:
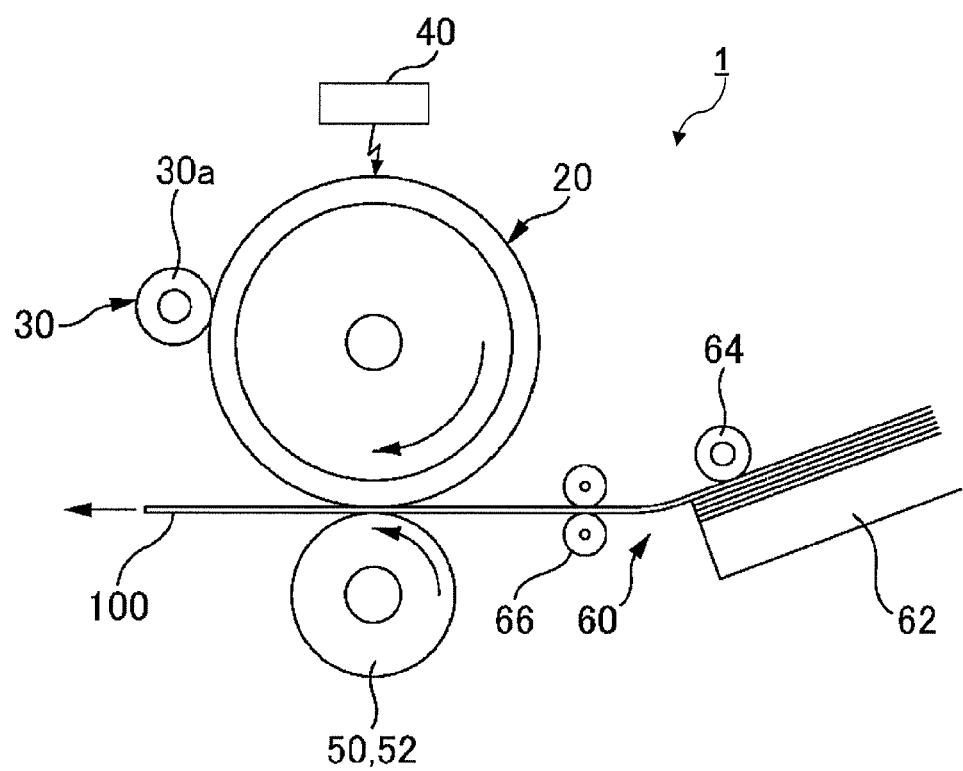
FIG. 3 is a schematic view showing the configuration of the image recording device 1 for electronic paper.
Figure 4:
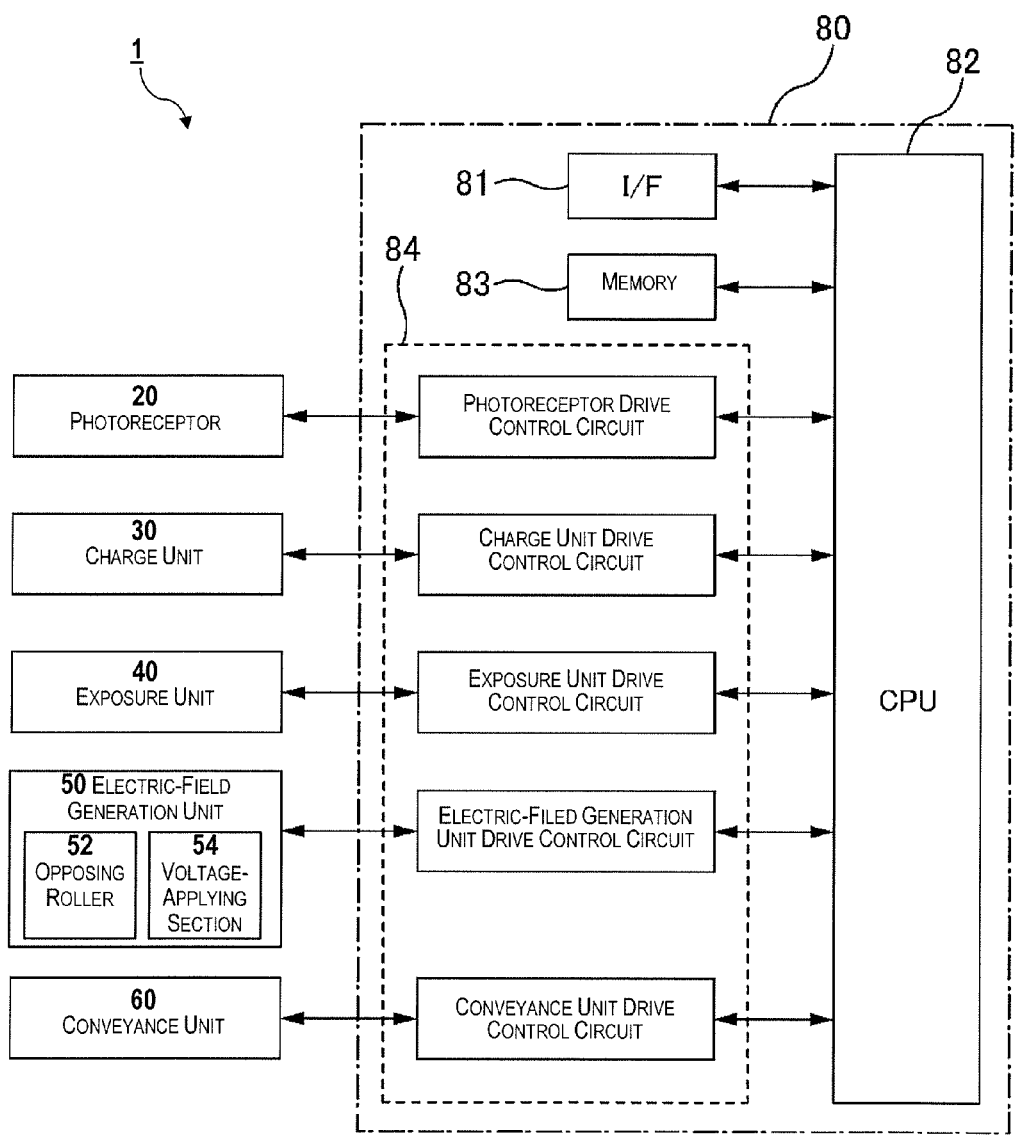
FIG. 4 is a block diagram showing the control configuration of the image recording device 1 for electronic paper.

Next, a configuration example of the image recording device will be described with reference to FIGS. 3 and 4. FIG. 3 is a schematic view showing the configuration of the image recording device 1. FIG. 4 is a block diagram showing the control configuration of the image recording device 1 for electronic paper.

The image recording device 1 for electronic paper according to the present embodiment has a charge unit 30, exposure unit 40, and electric-field generation unit 50 (opposing roller 52 as an example of the opposing member) along the rotational direction of the photoreceptor 20 as an example of the image support body for supporting a latent image, as shown in FIG. 3; and furthermore has a conveyance unit 60 as an example of the supply section, and a controller 80 (see FIG. 4) for controlling these units and the like, and operations of the image recording device 1.

The photoreceptor 20 has a cylindrical electroconductive substrate made of metal, and a photosensitive resin layer for holding an electrostatic charge and that is formed on the external peripheral surface. The photoreceptor 20 is capable of rotating about the center of the central axis and rotates clockwise in the in the present embodiment, as indicated by the arrow in FIG. 3.

The charge unit 30 is used for charging the photoreceptor 20. The charge unit 30 has a charge roller 31, and in the present embodiment, the charge roller 31 charges the photoreceptor 20 to $V1=-500$ V.

The exposure unit 40 forms a latent image on the photoreceptor 20 charged by laser irradiation. The exposure unit 40 has a semiconductor laser, a polygon mirror, an F-θ lens, and the like, and irradiates modulated laser light onto the charged photoreceptor 20 on the basis of an image signal inputted from a PC, word processor, or another host computer (not shown). In the present embodiment, laser light is irradiated onto the portion that corresponds to the image part of the latent image among the image part and the non-image part (background part) (in the present section, the portion on the photoreceptor 20 that corresponds to the black image part in the electronic paper 100 is referred to as an "image part," and the portion on the photoreceptor 20 that corresponds to the white image part (white background part) is referred to as a "non-image part" (background part), and the potential of the part is V1=−500 V to V2=−50 V (a latent image having an image part of V2=−50 V and a non-image part (background part) of V1=−500 V).

The electric-field generation unit 50 generates an electric field in the thickness direction of the electronic paper 100, and is used for causing the positively charged white particles and the negatively charged black particles of the electronic paper 100 to migrate in the thickness direction. The electric-field generation unit 50 is provided with an opposing roller 52 and a voltage-applying section 54 (see FIG. 4).

The opposing roller 52 is a rotatable roller that faces the photoreceptor 20. When the electronic paper 100 is positioned in the gap (nip section) between the photoreceptor 20 and the opposing roller 52, the opposing roller 52 rotates in accompaniment with the rotation of the photoreceptor 20 in the direction opposite of the rotating direction of the photoreceptor while sandwiching and compressing the electronic paper 100 in conjunction with the photoreceptor 20 (in other words, the photoreceptor 20 and the opposing roller 52 sandwich and compress the electronic paper 100 in the nip section). The contact portion of the opposing roller 52 that makes contact with the photoreceptor 20 via the electronic paper 100 is made of rubber.

The voltage-applying section 54 applies a voltage to the opposing roller 52 when the electronic paper 100 is positioned in the gap (i.e., the opposing roller 52 has a function as a section which voltage is applied). An electric field is thereby generated along the thickness direction of the electronic paper 100 between the photoreceptor 20 and the opposing roller 52, causing the positively charged white particles and the negatively charged black particles of the electronic paper 100 to move in the thickness direction.

The voltage-applying section 54 applies mutually different voltages when an image is recorded and when an image is erased. In other words, voltage is applied so that the positively charged white particles and the negatively charged black particles move during image recording and an image corresponding to the latent image is displayed on the electronic paper 100, and so that the positively charged white particles and the negatively charged black particles move during image erasure and the image displayed on the electronic paper 100 is erased. The specific manner in which voltage is applied is later described.

The conveyance unit 60 is used for conveying the electronic paper 100. The conveyance unit 60 has a paper cassette 62, a paper feed roller 64 positioned above the paper cassette 62, a conveyance roller 66 positioned on the photoreceptor 20 side of the configuration as viewed from the paper feed roller 64, and a paper discharge roller (not shown). The paper feed roller 64 is a roller for feeding electronic paper 100 stored in the paper cassette 62. The conveyance roller 66 is a roller for conveying electronic paper 100 fed by the paper feed roller 64 into the gap between the photoreceptor 20 and the opposing roller 52. The discharge roller is a roller for discharging the electronic paper 100 from the image recording device 1, the electronic paper 100 having images displayed or erased. These rollers are driven by a motor (not shown).

The controller 80 is a control unit (control section) for controlling the image recording device 1. The controller 80 has an interface section 81, a CPU 82, a memory 83, and a unit control circuit 84. The controller 80 functions as a voltage control section for controlling the voltage applied to the opposing roller 52.

The interface section 81 transmits and receives data between the image recording device 1 and the host computer, which is an external device. The CPU 82 is an arithmetic processing device for controlling the entire image recording device 1. The memory 83 is used for providing an area for storing CPU 82 programs, a work area, and other areas; and has a RAM, EEPROM, or the like. The CPU 82 controls each unit via the unit control circuit 84 in accordance with a program stored in the memory 83.

Aggregation of the Positively Charged White Particles and the Negatively Charged Black Particles As described above, an image is displayed when an electric field is generated along the thickness direction of the electronic paper 100 to move the positively charged white particles and the negatively charged black particles move inside the microcapsule 131. FIGS. 5A to 5E are views illustrating the state in which charged color particles have aggregated or dispersed. FIGS. 6A to 6C are views showing the voltage applied to the opposing roller 52. In a configuration, a DC voltage is applied to the opposing roller 52 in order to generate an electric field along the thickness direction of the electronic paper 100. In the case that a black image is displayed on the electronic paper 100, a DC voltage is applied to the opposing roller 52 to generate an upward electric field along the thickness direction of the electronic paper 100, and a white image is displayed (FIG. 5E) due the effect of the electric field, wherein the positively charged white particles migrate upward and the negatively charged black particles migrate downward (see FIG. 5A). When DC voltage is applied at this point in a configuration, the electric field does not vary together with time in the thickness direction, and a situation arises in which the negatively charged black particles which should be migrating downward become surrounded by and cannot escape from the group of positively charged white particles that is migrating upward (see FIG. 5B). When such an aggregate state is formed, black parts become mixed in locations in which a white image should be displayed, and a sharp white image is not displayed.

Figure 5A:
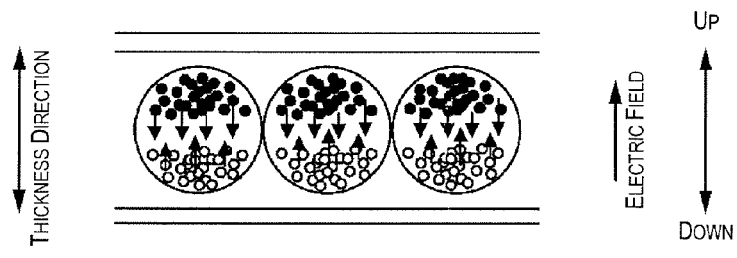
FIG. 5A is a view showing the state in which charged color particles have started moving after an electric field has been generated.
Figure 5B:
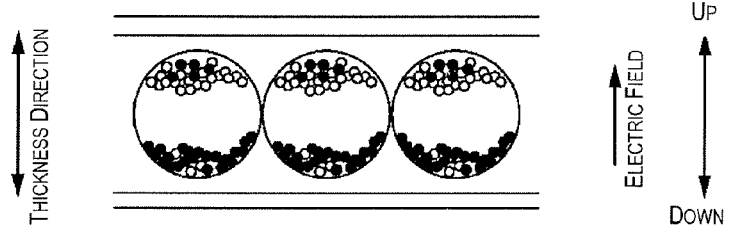
FIG. 5B is a view showing the charged color particles in an aggregated state.
Figure 5C:
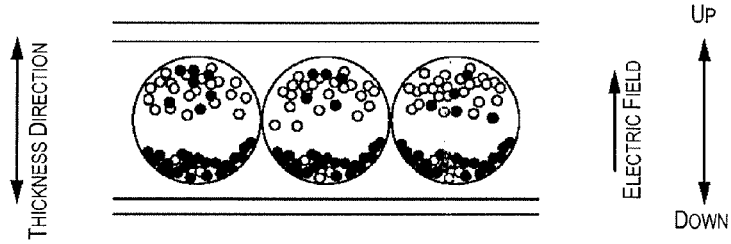
FIG. 5C is a view showing the dispersive movement state of the charged color particles.
Figure 5D:
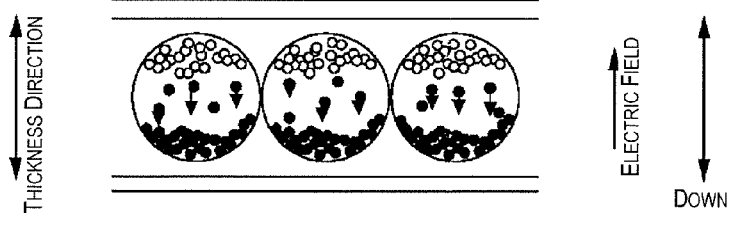
FIG. 5D is a view showing the state in which charged color particles have been released from the aggregated state.
Figure 5E:
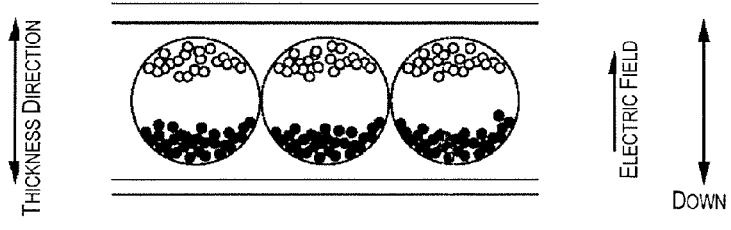
FIG. 5E is a view showing the ideal arrangement of charged color particles.

In order to avoid such a reduction in image quality, the voltage-applying section 54 impresses on the opposing roller 52 a voltage in which an AC voltage has been superimposed on a DC voltage during image recording, and the controller 80 controls this voltage, whereby the electric field generated along the thickness direction of the electronic paper 100 is temporarily weakened (see FIG. 6A. The details are later described). The aggregated particles shown in FIG. 5C are thereby loosened from the aggregated state shown in FIG. 5B, and after particles have escaped from the aggregated state as shown in FIG. 5D, the ideal particle arrangement shown in FIG. 5E can be achieved. Therefore, the image quality can be improved during image recording. An operational example during image recording is described in detail below.

Operational Example of Image Recording

An operation example of image recording by the image recording device 1 will be described with reference to FIGS. 2, 3, and FIG. 6A. FIG. 6A is a view showing the voltage applied to the opposing roller 52 during image recording. The voltage applied to the opposing roller 52 is a voltage in which an AC voltage has been superimposed on a DC voltage, and the value of the superimposed voltage varies together with time.

As used herein, AC voltage refers to a voltage that periodically varies in magnitude and direction together with time, regardless of the shape of the waveform (e.g., a concept that includes sinusoidal waves, rectangular waves, triangular waves, sawtooth waves, and the like). A voltage in which a rectangular wave such as that shown in FIG. 6A has been superimposed is applied in the present embodiment. The period of the superimposed voltage (rectangular wave) is 10 msec.

The operations of the image recording device 1 during image recording are mainly carried out by the controller 80. In particular, in the present embodiment, a program stored in the memory 83 is executed by the CPU 82. The program is composed of a code for carrying out the operations described below.

The photoreceptor 20 rotates under the control of the unit control circuit 84 when an image signal and a control signal are inputted from a host computer to the controller 80 via the interface section 81. The electronic paper 100 on which an image has not yet been displayed is stored in the paper cassette 62.

The photoreceptor 20 is rotated and charged to V1=−500 V in a sequential fashion by the charge unit 30 in the charging position.

The region of the photoreceptor 20 that has been charged reaches the exposure position in accompaniment with the rotation of the photoreceptor 20, and a latent image is formed in the region by the exposure unit 40. In other words, a laser is irradiated onto the region if the region is a portion that corresponds to the image part of the latent image. As a result, a latent image having an image part of V2=−50 V and a non-image part (background part) of V1=−500 V is formed on the photoreceptor 20.

The latent image formed on the photoreceptor 20 arrives at the opposing position facing the opposing roller 52 in accompaniment with the rotation of the photoreceptor 20. The electronic paper 100 is conveyed by the conveyance unit 60 into the gap between the opposing roller 52 and the photoreceptor 20 (i.e., the latent image), and is positioned in the gap. With the electronic paper 100 positioned in the gap, voltage is applied to the opposing roller 52 by the voltage-applying section 54, and an electric field is generated along the thickness direction of the electronic paper 100 in the gap. The image corresponding to the latent image is thereby displayed on the electronic paper 100.

Specifically, the voltage-applying section 54 applies voltage to the opposing roller 52 so that the value of the voltage varies within a range of the lowest potential (V1 (−500) V in the present embodiment) or greater and the highest potential (V2 (−50) V in the present embodiment) or less among the potentials in the image part and non-image part, as shown in FIG. 6A. In other words, in the case that the voltage shown in FIG. 6A is applied to the opposing roller 52, the value of the voltage applied to the opposing roller 52 varies within a range between V1 to V2 with the elapse of time.

In the interval T1, voltage is applied when the image part of the latent image is positioned in the opposing position, whereupon the photoreceptor 20 side (upper side) is charged to VL=−50 V (V2 volts) and the opposing roller 52 side (lower side) is charged to VT=−400 V. Therefore, a downward electric field (in the direction facing from the upper insulating layer 141 of the electronic paper 100 toward the lower insulating layer 142) is generated, as shown in left diagram of FIG. 2. The negatively charged black particles inside the electronic paper 100 migrate to the upper insulating layer 141 (display surface 121) side and the positively charged white particles migrate to the lower insulating layer 142 side due to the effect of the electric field.

Next, in the interval T2, the image part of the latent image continues to be present in the opposing position and when the voltage is applied, the photoreceptor 20 side (upper side) is charged to VL=−50 V (V2 volts) and the opposing roller 52 side (lower side) is charged to VT=−150 V. Therefore, a downward electric field (in the direction facing from the upper insulating layer 141 of the electronic paper 100 toward the lower insulating layer 142) is generated, as shown in the left diagram of FIG. 2. The negatively charged black particles inside the electronic paper 100 move to the upper insulating layer 141 (display surface 121) side and the positively charged white particles migrate to the lower insulating layer 142 side due to the effect of the electric field.

Here, when the electric field in the interval T1 and the electric field in the interval T2 are compared with respect to the image part of the latent image, the direction of the electric field is the same, but the magnitude of the electric field in the interval T1 is greater than that of the interval T2. In other words, the electric field is weaker in the interval T2 than in the interval T1. In such a configuration, the movement of the negatively charged black particles that were migrating upward in interval T1 is slowed in interval T2, and the negatively charged black particles are affected by interparticle repulsive force with other particles. Similarly, the positively charged white particles migrate downward while under the influence of the interparticle repulsive force. Accordingly, the particles migrate while being dispersed. Therefore, the aggregated state of the positively charged white particles and the negatively charged black particles is loosened.

In this manner, the strength of the electric field is repeatedly increased and decreased in a periodic fashion in the short period of time that the image part of the latent image is present in the opposing position, thereby making it possible to resolve a situation in which the positively charged white particles, which should be migrating downward, become surrounded by and cannot escape from the group of negatively charged black particles that is migrating upward. As a result, the positively charged white particles migrate downward and only the negatively charged black particles move upward. Therefore, a sharp black image without the presence of a white part is displayed in the location where the electronic paper 100 is positioned in the gap (the location being the black image part).

On the other hand, in interval T1, voltage is applied when the non-image part of the latent image is positioned in the opposing position, whereupon the photoreceptor 20 side (upper side) is charged to V0=−500 V (V1 volts) and the opposing roller 52 side (lower side) is charged to VT=−400 V. Therefore, an upward electric field (in the direction facing from the lower insulating layer 142 of the electronic paper 100 toward the upper insulating layer 141) is generated, as shown in the right diagram of FIG. 2. The positively charged white particles inside the electronic paper 100 move to the upper insulating layer 141 (display surface 121) side and the negatively charged black particles migrate to the lower insulating layer 142 side due to the effect of the electric field.

Next, in the interval T2, the non-image part of the latent image continues to be present in the opposing potion and when the voltage is applied, the photoreceptor 20 side (upper side) is charged to V0=−500 V (V1 volts) and the opposing roller 52 side (lower side) is charged to VT=−150 V. Therefore, an upward (the direction facing from the lower insulating layer 142 of the electronic paper 100 toward the upper insulating layer 141) electric field is generated, as shown in the right diagram of FIG. 2. The positively charged white particles inside the electronic paper 100 migrate to the upper insulating layer 141 (display surface 121) side and the negatively charged black particles migrate to the lower insulating layer 142 side due to the effect of the electric field.

Here, when the electric field in the interval T1 and the electric field in the interval T2 are compared with respect to the non-image part of the latent image, the direction of the electric field is the same, but the magnitude of the electric field in the interval T1 is less than that of the interval T2. In other words, the electric field is stronger in the interval T2 than in the interval T1. In such a configuration, the negatively charged black particles that escaped from the aggregated state because of the weak electric field in the interval T1 migrate downward in interval T2 without been affected by the interparticle repulsive force with other particles. Similarly, the group of positively charged white particles migrate upward without being surrounded by the negatively charged black particles.

In this manner, the strength of the electric field is repeatedly increased and decreased in a periodic fashion in the short period of time that the non-image part of the latent image is present in the opposing position, thereby making it possible to resolve a situation in which the negatively charged black particles, which should be migrating downward, become surrounded by and cannot escape from the group of positively charged white particles that is migrating upward. As a result, the negatively charged black particles migrate downward and only the positively charged white particles migrate upward. Therefore, a sharp white image without the presence of a black part is displayed in the location where the electronic paper 100 is positioned in the gap (the location being the white image part (white background part)).

Therefore, a latent image having an image part and a non-image part can be transferred (copied) to electronic paper 100 because a black image is displayed on the electronic paper 100 when the image part of the latent image is positioned in the opposing position, and a white image is displayed on the electronic paper 100 when the non-image part is in the opposing position.

As described above, in the present embodiment, the voltage-applying section 54 generates an electric field along the thickness direction in the gap between the photoreceptor 20 and the opposing roller 52 by applying voltage to the opposing roller 52, and an image corresponding to the latent image is displayed on the electronic paper 100 when the charged color particles are caused to move in the thickness direction. In other words, the controller 80 (voltage control section) controls the voltage so that the value of the voltage applied to the opposing roller 52 varies together with time. The controller 80 thereby causes a black and white image corresponding to the latent image to be displayed on the electronic paper 100 by controlling the magnitude of the electric field generated in the gap between the opposing roller 52 and the image part of the photoreceptor.

The operation for displaying an image described above is continuously carried out. In other words, the electronic paper 100 is conveyed by the conveyance unit 60, and mutually different locations of the electronic paper 100 are sequentially fed to the gap (nip section). Meanwhile, mutually different locations of the photoreceptor 20 on which the latent image is formed are sequentially fed to the gap (the opposing position) by rotation of the photoreceptor 20. The image corresponding to the latent image is sequentially displayed in the stated locations on the electronic paper 100 in the gap (the latent image is sequentially transferred to the electronic paper 100).

The electronic paper 100 on which image display (transfer) has been completed is discharged from the image recording device 1 by a discharge roller. The image recording device 1 carries out operation such as that described above during image recording.

Embodiment 2

Next, described in embodiment 2 is another mode of the image recording device 1 for recording images to the electronic paper 100 having the configuration described above.

The configuration of a device 1A for recording an image according to the invention is the same as the image recording device 1 described in embodiment 1.

The device 1A for recording an image according to the present embodiment may be used as a dedicated image recording device or as an image recording and erasure device in the same manner as embodiment 1.

As described above, when the particles inside the microcapsule of the electronic paper 100 form an aggregated state (see FIG. 5B), black parts become mixed in locations in which a white image should be displayed, and a sharp white image is not displayed.

In order to avoid such a reduction in image quality, the voltage-applying section 54 applies to the opposing roller 52 a voltage in which an AC voltage has been superimposed on a DC voltage during image recording, and the controller 80 controls this voltage, whereby the electric field generated along the thickness direction of the electronic paper 100 is temporarily eliminated (see FIG. 6B; a detailed description is provided further hereunder). The aggregated particles shown in FIG. 5C are thereby loosened from the aggregated state shown in FIG. 5B, and after particles have escaped from the aggregated state as shown in FIG. 5D, the ideal particle arrangement shown in FIG. 5E can be achieved. Therefore, the image quality can be improved during image recording. An operational example during image recording is described in detail below.

Operational Example of Image Recording

An operation example of image recording by the device 1A for recording an image will be described with reference to FIGS. 2, 3, and FIG. 6B. FIG. 6B is a view showing the voltage applied to the opposing roller 52 during image recording. The voltage applied to the opposing roller 52 is a voltage in which an AC voltage has been superimposed on a DC voltage, and the value of the superimposed voltage varies together with time.

As used herein, AC voltage refers to voltage that periodically varies in magnitude and direction together with time, regardless of the shape of the waveform (e.g., a concept that includes sinusoidal waves, rectangular waves, triangular waves, sawtooth waves, and the like). Voltage in which a rectangular wave such as that shown in FIG. 6B has been superimposed is applied in the present embodiment. The period of the superimposed voltage (rectangular wave) is 10 msec.

The operations of the device 1A for recording an image during image recording are mainly carried out by the controller 80. In particular, in the present embodiment, a program stored in the memory 83 is executed by the CPU 82. The program is composed of a code for carrying out the operations described below.

The photoreceptor 20 rotates under the control of the unit control circuit 84 when an image signal and a control signal are inputted from a host computer to the controller 80 via the interface section 81. The electronic paper 100 on which an image has not yet been displayed is stored in the paper cassette 62.

The photoreceptor 20 is rotated and charged to V1=−500 V in a sequential fashion by the charge unit 30 in the charging position.

The region of the photoreceptor 20 that has been charged reaches the exposure position in accompaniment with the rotation of the photoreceptor 20, and a latent image is formed in the region by the exposure unit 40. In other words, laser light is irradiated onto the region if the region is a portion that corresponds to the image part of the latent image. As a result, a latent image having an image part of V2=−50 V and a non-image part (background part) of V1=−500 V is formed on the photoreceptor 20.

The latent image formed on the photoreceptor 20 arrives at the opposing position facing the opposing roller 52 in accompaniment with the rotation of the photoreceptor 20. The electronic paper 100 is conveyed by the conveyance unit 60 into the gap between the opposing roller 52 and the photoreceptor 20 (i.e., the latent image), and is positioned in the gap. With the electronic paper 100 positioned in the gap, voltage is applied to the opposing roller 52 by the voltage-applying section 54, and an electric field is generated along the thickness direction of the electronic paper 100 in the gap. The image corresponding to the latent image is thereby displayed on the electronic paper 100.

Specifically, the voltage-applying section 54 applies voltage to the opposing roller 52 so that the value of the voltage is V1 or V2, wherein the value of the voltage varies within a range of the lowest potential (V1 (−500) V in the present embodiment) or greater and the highest potential (V2 (−50) V in the present embodiment) or less among the potentials in the image part and non-image part, as shown in FIG. 6B, and so that the value of the voltage is V1 or V2.

In other words, a voltage that periodically brings the electric field generated between the opposing roller 52 and the photoreceptor 20 to zero is applied to the opposing roller 52 in the case that the voltage shown in FIG. 6B is applied to the opposing roller 52.

In the interval T1, voltage is applied when the image part of the latent image is positioned in the opposing position, whereupon the photoreceptor 20 side (upper side) is charged to VL=−50 V (V2 volts) and the opposing roller 52 side (lower side) is charged to VT=−500 V. Therefore, a downward electric field (in the direction facing from the upper insulating layer 141 of the electronic paper 100 toward the lower insulating layer 142) is generated, as shown in left diagram of FIG. 2. The negatively charged black particles inside the electronic paper 100 migrate to the upper insulating layer 141 (display surface 121) side and the positively charged white particles migrate to the lower insulating layer 142 side due to the effect of the electric field.

Next, in the interval T2, the image part of the latent image continues to be present in the opposing position and when the voltage is applied, the photoreceptor 20 side (upper side) is charged to VL=−50 V (V2 volts) and the opposing roller 52 side (lower side) is charged to VT=−50 V. Therefore, an electric field is not generated (zero electric field). Accordingly, the migration of the negatively charged black particles and the positively charged white particles in each direction inside the electronic paper 100 is interrupted because the electric field has not effect.

Here, when the electric field in the interval T1 and the electric field in the interval T2 are compared with respect to the image part of the latent image, an electric field is generated in the interval T1, but an electric field is not generated in the interval T2. In other words, the electric field of interval T1 has been eliminated in interval T2. In such a configuration, the momentum of the movement of the negatively charged black particles that were migrating upward in interval T1 is not present in interval T2, and the negatively charged black particles are affected by interparticle repulsive force with other particles. Similarly, the positively charged white particles are also affected by the interparticle repulsive force and downward movement is stopped. Accordingly, the particles migrate while being dispersed. Therefore, the aggregated state of the positively charged white particles and the negatively charged black particles is loosened.

In this manner, the existence and nonexistence of the electric field is repeated in a periodic fashion in the short period of time that the image part of the latent image is present in the opposing position, thereby making it possible to resolve a situation in which the positively charged white particles, which should be migrating downward, become surrounded by and cannot escape from the group of negatively charged black particles that is migrating upward. As a result, only the positively charged white particles migrate downward and only the negatively charged black particles migrate upward. Therefore, a sharp black image without the presence of a white part is displayed in the location where the electronic paper 100 is positioned in the gap (the location being the black image part).

Applying the voltage shown in FIG. 6B to the opposing roller 52 makes it possible for the surrounded particles to readily escape because the electric field can be completely eliminated by setting the magnitude of the electric field to zero rather than weakening the electric field by reducing the magnitude of the electric field. Therefore, in comparison with when the voltage shown in FIG. 6A is applied, the effect of avoiding a state in which particles become surrounded and cannot escape can be dramatically enhanced.

On the other hand, in interval T1, voltage is applied when the non-image part of the latent image is positioned in the opposing position, whereupon the photoreceptor 20 side (upper side) is charged to V0=−500 V (V1 volts) and the opposing roller 52 side (lower side) is charged to VT=−500 V. Therefore, an electric field is not generated.

Next, in the interval T2, the non-image part of the latent image continues to be present in the opposing potion and when the voltage is applied, the photoreceptor 20 side (upper side) is charged to V0=−500 V (V1 volts) and the opposing roller 52 side (lower side) is charged to VT=−150 V. Therefore, an upward electric field (in the direction facing from the lower insulating layer 142 of the electronic paper 100 toward the upper insulating layer 141) is generated, as shown in the right diagram of FIG. 2. The positively charged white particles inside the electronic paper 100 migrate to the upper insulating layer 141 (display surface 121) side and the negatively charged black particles migrate to the lower insulating layer 142 side due to the effect of the electric field.

Here, when the electric field in the interval T1 and the electric field in the interval T2 are compared with respect to the image part of the latent image, an electric field is not generated in the interval T1, but an electric field is generated in the interval T2. In other words, the electric field is stronger in interval T2 than in interval T1. In such a configuration, the negatively charged black particles that escape from the aggregated state when the electric field in interval T1 is eliminated migrate downward in interval T2 without being affected by the interparticle repulsive force with other particles. Similarly, the group of positively charged white particles migrate upward without being surrounded by the negatively charged black particles.

In this manner, the existence and nonexistence of the electric field is repeated in a periodic fashion in the short period of time that the non-image part of the latent image is present in the opposing position, thereby making it possible to resolve a situation in which the negatively charged black particles, which should be migrating downward, become surrounded by and cannot escape from the group of positively charged white particles that is migrating upward. As a result, only the negatively charged black particles migrate downward and only the positively charged white particles migrate upward. Therefore, a sharp black image without the presence of a black part is displayed in the location where the electronic paper 100 is positioned in the gap (the location being the white image part (white background part)).

Therefore, a latent image having an image part and a non-image part can be transferred (copied) to electronic paper 100 because a black image is displayed on the electronic paper 100 when the image part of the latent image is positioned in the opposing position, and a white image is displayed on the electronic paper 100 when the non-image part is in the opposing position.

As described above, in the present embodiment, the voltage-applying section 54 generates an electric field along the thickness direction in the gap between the photoreceptor 20 and the opposing roller 52 by applying voltage to the opposing roller 52, and an image corresponding to the latent image is displayed on the electronic paper 100 when the charged color particles are caused to move in the thickness direction. In other words, the controller 80 (voltage control section) controls the voltage so that the value of the voltage applied to the opposing roller 52 varies together with time. The controller 80 thereby causes a black and white image corresponding to the latent image to be displayed on the electronic paper 100 by controlling the existence of the electric field generated in the gap between the opposing roller 52 and the image part of the photoreceptor.

The operation for displaying an image described above is continuously carried out. In other words, the electronic paper 100 is conveyed by the conveyance unit 60, and mutually different locations of the electronic paper 100 are sequentially fed to the gap (nip section). Meanwhile, mutually different locations of the photoreceptor 20 on which the latent image is formed are sequentially fed to the gap (the opposing position) by rotation of the photoreceptor 20. The image corresponding to the latent image is sequentially displayed in the stated locations on the electronic paper 100 in the gap (the latent image is sequentially transferred to the electronic paper 100).

The electronic paper 100 on which image display (transfer) has been completed is discharged from the image recording device 1 by a discharge roller. The device 1A for recording an image carries out operation such as that described above during image recording.

Embodiment 3

The image recording devices 1, 1A according to embodiments 1 and 2 can provide not only a function for recording an image to the electronic paper 100, but also provide a function for erasing an image from the electronic paper 100. An image recording device 1B (not shown) provided also with a function for erasing images from the electronic paper 100 will be described in detail below.

Residual Image on the Electronic Paper 100 During Image Erasure

As described above, the image recording device 1, 1A according to embodiments 1 and 2 are capable of recording an image on the electronic paper 100 as a result of carrying out image recording operations.

On the other hand, a user will desire to erase confidential information so as to avoid disclosure of the confidential information in the case that confidential information is displayed in an image thus recorded on the electronic paper 100 (at this point, the confidential information is not required to be displayed on the electronic paper 100).

A method for erasing and blanking the electronic paper has been used when images already recorded on the electronic paper 100 are to be erased.

This erasure method is intended to uniformly make all locations on the electronic paper 100 white image parts. Therefore, there is a possibility that the already recorded image (the image to be erased) will faintly remain (a residual image of the erased) if the blanking is insufficient (naturally, when an attempt is made to make all locations on the electronic paper black image parts (referred to as "blacking" for the sake of convenience) rather than white image parts, there is a possibility that a residual image will appear when blacking is insufficient). In such a case, confidential information may be disclosed.

The voltage-applying section 54 applies to the opposing roller 52 a voltage in which an AC voltage has been superimposed on a DC voltage during image erasure in order to prevent such disclosure of confidential information, and the controller 80 controls this voltage, whereby the orientation of the electric field generated along the thickness direction of the electronic paper 100 is inverted (the details are later described). The situation in which an erased image faintly remains (a residual image of the erased image appears) can be adequately avoided because a black image and a white image is repeated and the image to be erased is overwritten. In other words, in accordance with the image recording device 1B according to the present embodiment, an image on the electronic paper 100 is adequately erased (the objective of preventing disclosure of confidential information is adequately achieved). An operation example during image erasure is described in detail below.

Operational Example of Image Erasure

An operation example of image erasure by the image recording device 1B will be described with reference to FIGS. 2, 3, and FIG. 6C. FIG. 6C is a view showing the voltage applied to the opposing roller 52 during image erasure. The voltage applied to the opposing roller 52 is a voltage in which an AC voltage has been superimposed on a DC voltage, and the value of the superimposed voltage varies together with time.

As used herein, AC voltage refers to voltage that periodically varies in magnitude and direction together with time, regardless of the shape of the waveform (e.g., a concept that includes sinusoidal waves, rectangular waves, triangular waves, sawtooth waves, and the like). Voltage in which a rectangular wave such as that shown in FIG. 6C has been superimposed is applied in the present embodiment. The period of the superimposed voltage (rectangular wave) is 10 msec.

The photoreceptor 20 rotates under the control of the unit control circuit 84 when an image signal and a control signal are inputted from a host computer to the controller 80 via the interface section 81. The electronic paper 100 on which an image (an image to be erased and which has already been recorded by the image recording described above) has been displayed is stored in the paper cassette 62.

The photoreceptor 20 is rotated and charged to $V1 = -500 V$ in a sequential fashion by the charge unit 30 in the charging position.

The region of the photoreceptor 20 that has been charged reaches the exposure position in accompaniment with the rotation of the photoreceptor 20, and a latent image is formed in the region by the exposure unit 40. In other words, a laser light is irradiated onto the region if the region is a portion that corresponds to the image part of the latent image. As a result, a latent image having an image part of V2=−50 V and a non-image part (background part) of V1=−500 V is formed on the photoreceptor 20.

The charged location on the photoreceptor 20 arrives at the opposing position facing the opposing roller 52 in accompaniment with the rotation of the photoreceptor 20. The electronic paper 100 is conveyed by the conveyance unit 60 into the gap between the opposing roller 52 and the photoreceptor 20 (i.e., the charged location on the photoreceptor 20), and is positioned in the gap. With the electronic paper 100 positioned in the gap, voltage is applied to the opposing roller 52 by the voltage-applying section 54, and an electric field is generated along the thickness direction of the electronic paper 100 in the gap. The image on the electronic paper 100 thus conveyed into the gap is thereby erased from the electronic paper 100.

Specifically, the voltage-applying section 54 applies voltage to the opposing roller 52 so that the value of the voltage varies so as to include a value that is V1 or greater and V2 or less, and at least one value from among a value that is less than the lowest potential (V1 (−500) V in the present embodiment) and a value greater than the highest potential (V2 (−50) V in the present embodiment) among the potentials in the image part and non-image part, as shown in FIG. 6C. In other words, the voltage-applying section 54 applies voltage that periodically vertically inverts the orientation of the electric field generated in the gap between the opposing roller 52 and the photoreceptor 20.

In the interval T1, voltage is applied when the image part of the latent image is positioned in the opposing position, whereupon the photoreceptor 20 side (upper side) is charged to VL=−50 V (V2 volts) and the opposing roller 52 side (lower side) is charged to VT=−600 V. Therefore, a downward electric field (in the direction facing from the upper insulating layer 141 of the electronic paper 100 toward the lower insulating layer 142) is generated, as shown in left diagram of FIG. 2. The negatively charged black particles inside the electronic paper 100 move to the upper insulating layer 141 (display surface 121) side and the positively charged white particles migrate to the lower insulating layer 142 side due to the effect of the electric field. Therefore, a black image is displayed in the location of the electronic paper positioned in the gap 100 (the location being a black image part).

Next, in the interval T2, the image part of the latent image continues to be present in the opposing position and when the voltage is applied, the photoreceptor 20 side (upper side) is charged to VL=−50 V (V2 volts) and the opposing roller 52 side (lower side) is charged to VT=50 V. Therefore, an upward electric field (in the direction facing from the upper insulating layer 142 of the electronic paper 100 toward the lower insulating layer 141) is generated, as shown in the left diagram of FIG. 2. The negatively charged black particles inside the electronic paper 100 migrate to the lower insulating layer 142 side and the positively charged white particles migrate to the upper insulating layer 141 (display surface 121) due to the effect of the electric field. Therefore, a white image is displayed in the location of the electronic paper positioned in the gap 100 (the location being a white image part (white background part)).

On the other hand, in interval T1, voltage is applied when the non-image part of the latent image is positioned in the opposing position, whereupon the photoreceptor 20 side (upper side) is charged to VL=−500 V (V1 volts) and the opposing roller 52 side (lower side) is charged to VT=−600 V. Therefore, a downward electric field (the direction facing from the upper insulating layer 141 of the electronic paper 100 toward the lower insulating layer 142) is generated, as shown in the left diagram of FIG. 2. The negatively charged black particles inside the electronic paper 100 migrate to the upper insulating layer 141 (display surface 121) side and the positively charged white particles migrate to the lower insulating layer 142 side due to the effect of the electric field. Therefore, a black image is displayed in the location of the electronic paper positioned in the gap 100 (the location being a black image part).

Next, in the interval T2, the non-image part of the latent image continues to be present in the opposing potion and when the voltage is applied, the photoreceptor 20 side (upper side) is charged to VL=−500 and the opposing roller 52 side (lower side) is charged to VT=50 V. Therefore, an upward electric field (in the direction facing from the lower insulating layer 142 of the electronic paper 100 toward the upper insulating layer 141) is generated, as shown in the right diagram of FIG. 2. The negatively charged black particles inside the electronic paper 100 move to the lower insulating layer 142 side and the positively charged white particles migrate to the upper insulating layer 141 (display surface 121) side due to the effect of the electric field. Therefore, a white image is displayed in the location of the electronic paper positioned in the gap 100 (the location being a white image part (white background part)).

In other words, the orientation of the electric field is downward in interval T1, whereby the electronic paper 100 displays a black image, and the orientation of the electric field is upward in interval T2, whereby the electronic paper 100 displays a white image. When AC voltage is applied, the value of the voltage repeats between 50 V and −600 V. Therefore, a new display in which a black image and a white image have been repeated is displayed on the electronic paper 100, and the image (image to be erased) that had been displayed is erased (i.e., a display produced by repeating a black image and a white image is written over the image to be erased).

In this manner, in the present embodiment, the controller 80 controls the voltage applied to the opposing roller 52 so that the orientation of the electric field in the thickness direction of the electronic paper 100 varies together with time, whereby the charged color particles are caused to migrate in the thickness direction and the image on the electronic paper 100 conveyed to the gap is erased. The situation in which an erased image faintly remains (a residual image of the erased image appears) can be adequately avoided because a black image and a white image is repeated and the image to be erased is overwritten.

The above-described operation for erasing an image is carried out in continuous fashion. In other words, the electronic paper 100 is conveyed by the conveyance unit 60, and mutually different locations of the electronic paper 100 on which the image to be erased is displayed are sequentially fed to the gap (nip section). On the other hand, mutually different locations of the charged photoreceptor 20 are sequentially fed to the gap (the opposing position) by rotation of the photoreceptor 20. The image is sequentially erased in the stated locations on the electronic paper 100 in the gap (i.e., the controller 80 sequentially erases the image from the locations fed to the nip section).

The electronic paper 100 for which image erasure has been complete is discharged from the image recording device 1B by the discharge roller. The image recording device 1B provided with an image recording function and an image erasing function carries out operations such as those described above during image erasure.

Other Embodiments of the Image Recording Devices 1, 1A, 1B

In embodiments 1, 2, and 3, a description was mainly provided for an image recording device 1 for electronic paper 100, but also included is the disclosure of a method or the like for recording an image onto electronic paper 100. The embodiments described above are provided to facilitate understanding of the invention and are not to be interpreted as limiting the invention. Naturally, the invention may be changed and/or modified without departing from spirit of the invention, and such equivalents are included in the invention. In particular, the embodiments and modifications thereof described below are also included in the invention.

Figure 7A:
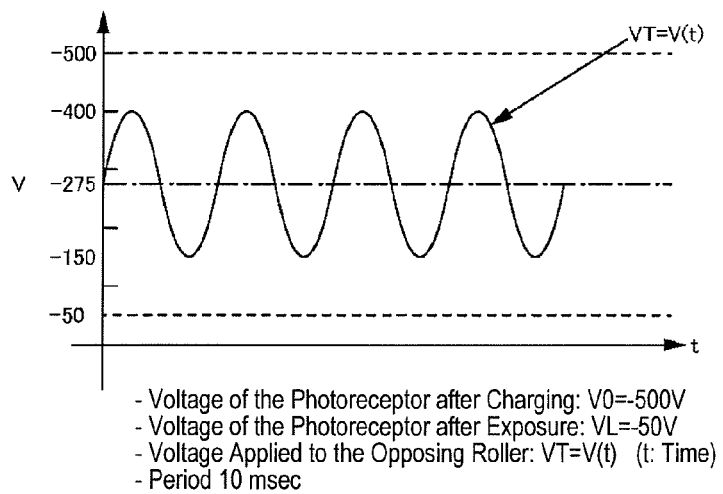
FIGS. 7A to 7C are views showing another example (sine wave) of the voltage applied to the opposing roller 52.
Figure 7B:
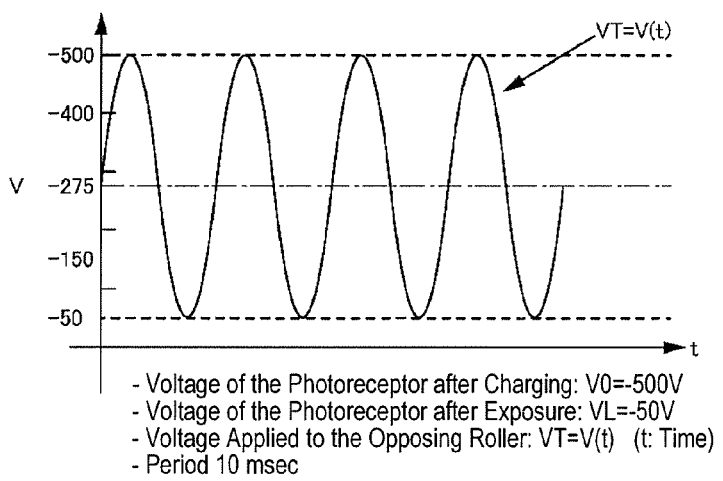
Figure 7C:
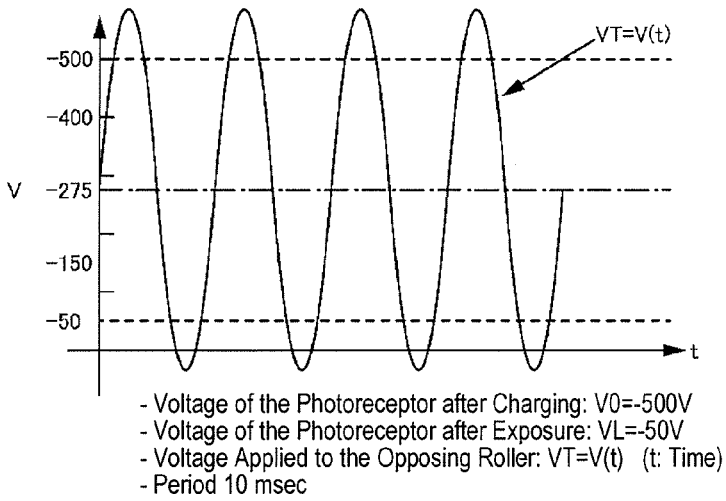
Figure 9A:
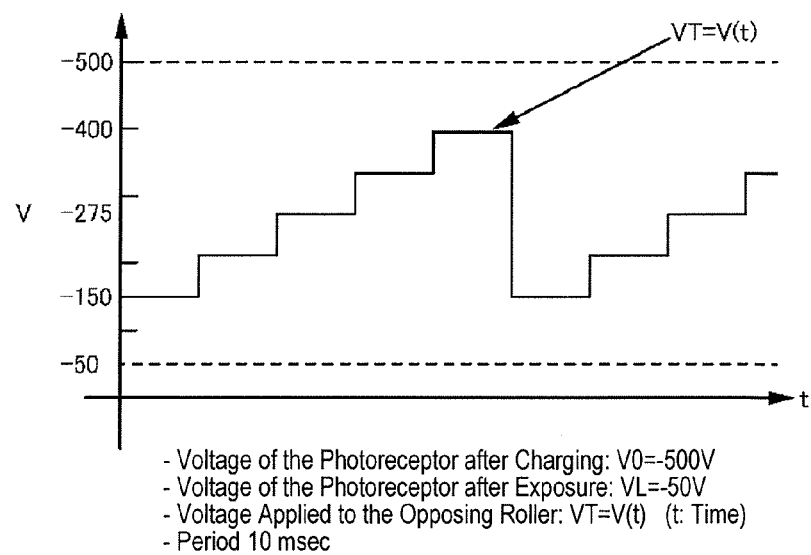
FIG. 9A is a view showing another example (staircase wave) of the voltage applied to the opposing roller 52 during image recording.
Figure 9B:
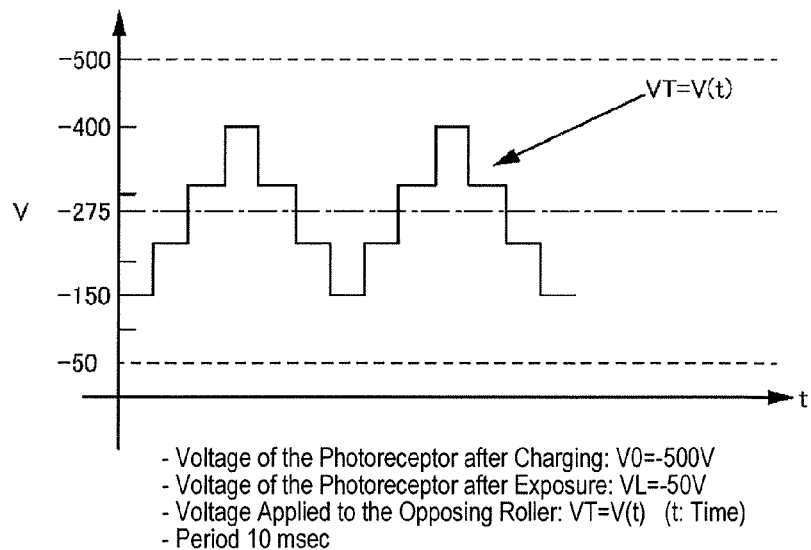
FIG. 9B is a view showing another example (staircase wave) of the voltage applied to the opposing roller 52 during image recording.

For example, the rectangular waveform voltage shown in FIGS. 6A to 6C is applied to the opposing roller 52 in the image recording device 1, 1A, 1B according to the embodiments described above, but the voltage waveform applied to the opposing roller 52 of the image recording devices 1, 1A, 1B is not limited thereby. For example, sinusoidal waves such as those shown in FIGS. 7A, 7B, and 7C are applied in place of FIGS. 6A, 6B, and 6C. It is also possible to apply triangular waves such as those shown in FIGS. 8A, 8B, and 8C. It is also possible to apply staircase wave voltage such as those shown in FIGS. 9A and 9B. For the sake of convenience, the first example of a staircase wave that can be used in place of FIG. 6A is shown in FIG. 9A, and a second example is shown in FIG. 9B.

Embodiment 4

Next, an image recording device for electronic paper 100 provided with two photoreceptors 20, charge units 30, exposure units 40, and electric-field generation units 50 each will be described with reference to FIGS. 10 to 12.

Configuration of Image Recording Device 2

Figure 10:
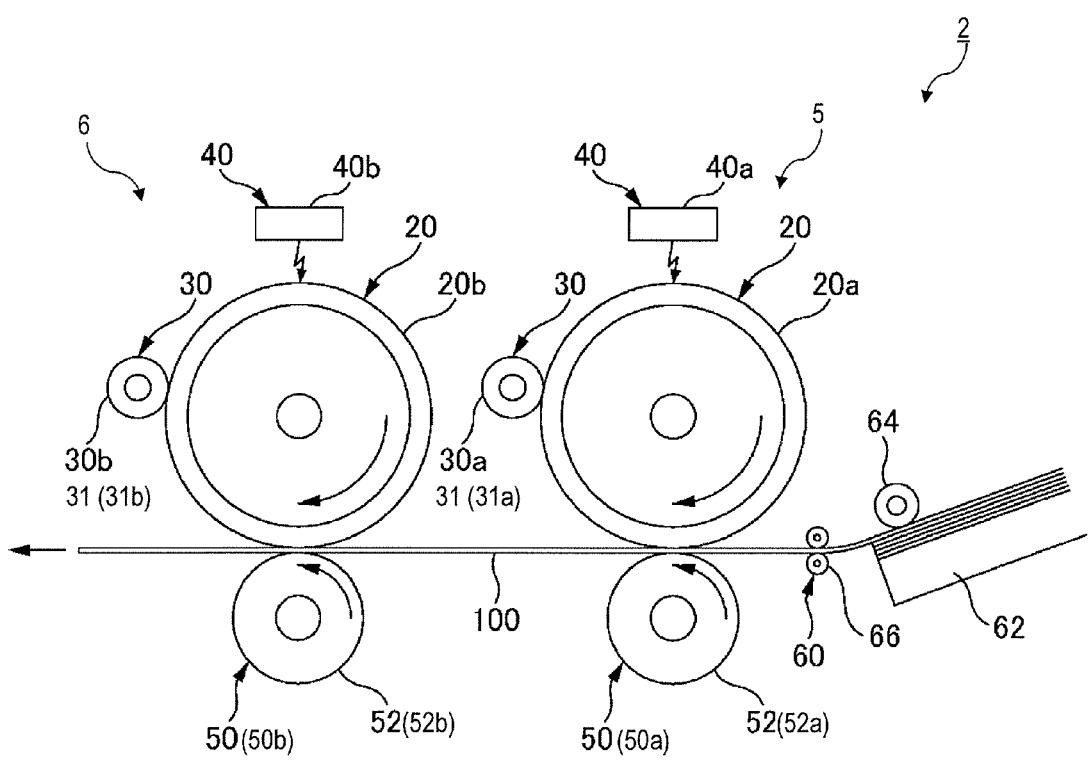
FIG. 10 is a cross-sectional view schematically showing the image recording device 2 for electronic paper.
Figure 11:
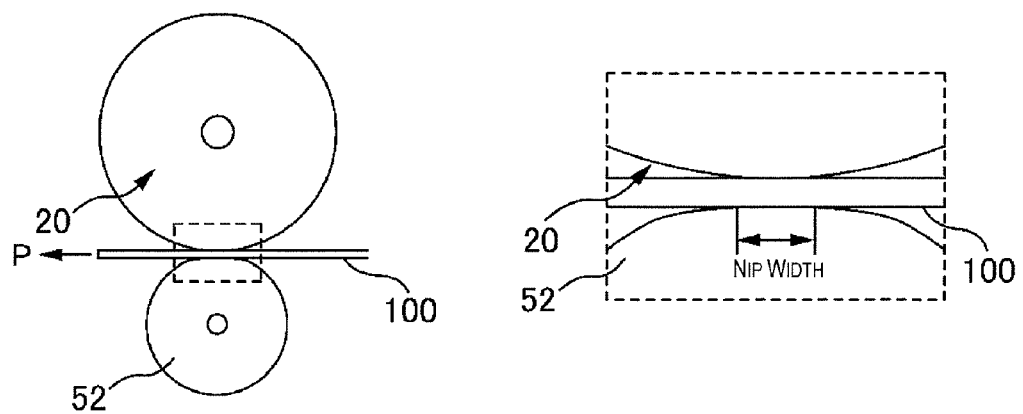
FIG. 11 is an enlarged view of the photoreceptor 20 and the opposing roller 52, and a further enlarged view of the sandwiched portion between the photoreceptor 20 and the opposing roller 52.

FIG. 10 is a cross-sectional view schematically showing the image recording device 2 for electronic paper. FIG. 11 is an enlarged view of the photoreceptor 20 and the opposing roller 52, and a further enlarged view of the sandwiched portion between the photoreceptor 20 and the opposing roller 52. FIG. 12 is a block view showing the control mechanism of the image recording device 2 for electronic paper.

The image recording device 2 for electronic paper 100 has a first unit 5 and a second unit 6, as shown in FIG. 10; and also has a conveyance unit 60 as an example of the conveyance member, and a controller 80 (FIG. 12) for controlling these units and the like and for directing operations as the image recording device 2 for electronic paper. The first unit 5 and the second unit 6 each have a photoreceptor 20 as an example of the image support body, a charge unit 30, an exposure unit 40, and an electric-field generation unit 50 (including an opposing roller 52 as an example of the opposing member). In other words, the first unit 5 has a first photoreceptor 20a, a first charge unit 30a, a first exposure unit 40a, and a first electric-field generation unit 50a; and the second unit 6 has second photoreceptor 20b, a second charge unit 30b, a second exposure unit 40b, and a second electric-field generation unit 50b.

The photoreceptor 20 has a cylindrical electroconductive substrate made metal, and a photosensitive resin layer for holding an electrostatic charge and that is formed on the external peripheral surface. The photoreceptor 20 is capable of rotating about the center of the central axis, and in the present embodiment, the first photoreceptor 20a and the second photoreceptor 20b each have a diameter of 78 mm and both rotate in the clockwise direction, as indicated by the arrow in FIG. 10.

The charge unit 30 is used for charging the photoreceptor 20. The image recording device 2 is provided with a first charge roller 31a and a second charge roller 31b in corresponding fashion to the first photoreceptor 20a and the second photoreceptor 20b. In the present embodiment, the first charge roller 31a charges the first photoreceptor 20a to −500 V, and the second charge roller 31b charges the second photoreceptor 20b to −500 V.

The exposure unit 40 forms a latent image on the photoreceptor 20 charged by laser irradiation. The image recording device 2 is provided with a first exposure unit 40a and a second exposure unit 40b in corresponding fashion to the first photoreceptor 20a and the second photoreceptor 20b. The exposure unit 40 has a semiconductor laser, a polygon mirror, an F-θ lens, and the like, and irradiates modulated laser light onto the charged photoreceptor 20 on the basis of an image signal inputted from a personal computer, word processor, or another host computer (not shown). In the present embodiment, laser light is irradiated onto the portion that corresponds to the image part of the latent image among the image part and the non-image part (background part), and the potential of the part irradiated with laser on the photoreceptor 20 is −500 V to −50 V.

The electric-field generation unit 50 generates an electric field in the thickness direction of the electronic paper 100, and is used for moving the positively charged white particles and the negatively charged black particles of the electronic paper 100 in the thickness direction. The image recording device 2 is provided with a first electric-field generation unit 50a and a second electric-field generation unit 50b in corresponding fashion to the first photoreceptor 20a and the second photoreceptor 20b. The first electric-field generation unit 50a and the second electric-field generation unit 50b are provided with a first opposing roller 52a and a second opposing roller 52b, respectively, as well as a voltage-applying section 54 (see FIG. 12).

The first opposing roller 52a and the second opposing roller 52b are rotatable rollers that face the first photoreceptor 20a and the second photoreceptor 20b, respectively, and each have a diameter of 30 mm. When the electronic paper 100 is positioned in the gap (nip section) between the first photoreceptor 20a and the first opposing roller 52a, the first opposing roller 52a rotates in accompaniment with the rotation of the first photoreceptor 20a in the direction opposite of the rotating direction of the first photoreceptor while sandwiching and compressing the electronic paper 100 in cooperation with the first photoreceptor 20a (in other words, the first photoreceptor 20a and the first opposing roller 52a sandwich and compress the electronic paper 100 in the nip section). Similarly, when the electronic paper 100 is positioned in the gap (nip section) between the second photoreceptor 20b and the second opposing roller 52b, the second opposing roller 52b rotates in accompaniment with the rotation of the second photoreceptor 20b in the direction opposite of the rotating direction of the second photoreceptor while sandwiching and compressing the electronic paper 100 in cooperation with the second photoreceptor 20b.

Here, FIG. 13 is a table showing the relationship between the center distance between the first photoreceptor 20a and the first opposing roller 52a or the center distance between the second photoreceptor 20b and the second opposing roller 52b, and the pressure-contact force and the nip width. The center distance between the photoreceptor 20 and the opposing roller 52 is set to be shorter than the total of the radius of the photoreceptor 20 and the radius of opposing roller 52. Specifically, in accordance with the above, the total of 39 mm as the radius of the photoreceptor 20 and 15 mm as the radius of the opposing roller 52 is 54 mm. The center distance between the photoreceptor 20 and the opposing roller 52 is 53.3 mm. The contact portion of the opposing roller 52 that makes contact with the photoreceptor 20 via the electronic paper 100 is an elastic body, e.g., rubber. In other words, the opposing roller 52 deforms into a shape that corresponds to the external peripheral surface of the photoreceptor 20 in the portion in which the opposing roller 52 faces the photoreceptor 20, whereby a compressive force is imparted to the electronic paper 100 therebetween (see FIG. 11).

Figure 12:
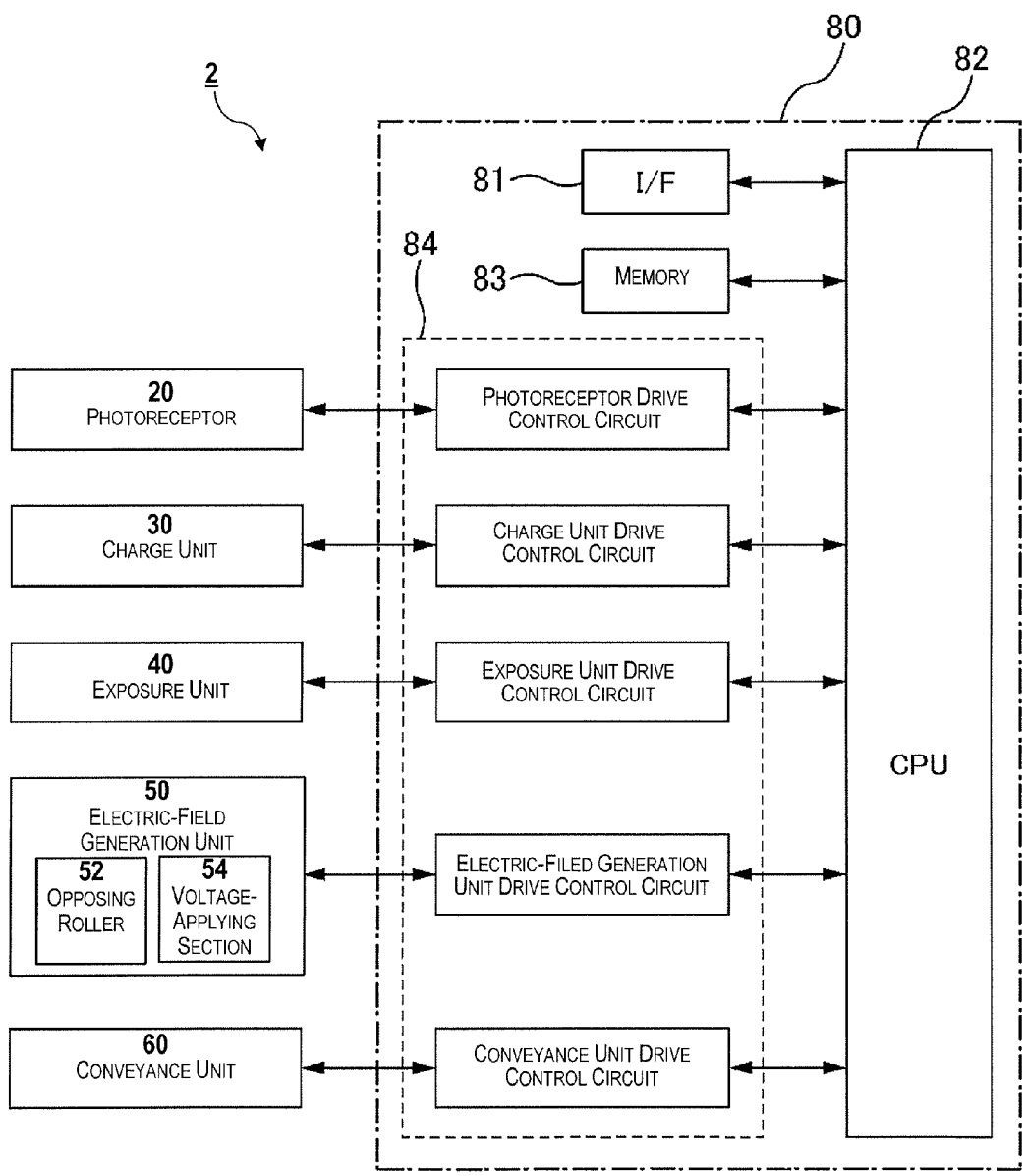
FIG. 12 is a block view showing the control mechanism of the image recording device 2 for electronic paper.

In other words, in the relationship shown in FIG. 12, the center distance between the photoreceptor 20 and the opposing roller 52 in the image recording device 2 is 53.3 mm, the bite is 0.7 mm, the nip width is 5.0 mm, and the compressive force is 48 gf/cm$^2$.

The voltage-applying section 54 applies voltage to the first opposing roller 52a and the second opposing roller 52b when the electronic paper 100 is positioned in the gap (i.e., the first opposing roller 52a and the second opposing roller 52b have a function as a section which voltage is applied). An electric field is thereby generated along the thickness direction of the electronic paper 100 between the first photoreceptor 20a and the first opposing roller 52a, and between the second photoreceptor 20b and the second opposing roller 52b, causing the positively charged white particles and the negatively charged black particles of the electronic paper 100 to migrate in the thickness direction.

The voltage-applying section 54 applies voltage so that the positively charged white particles and the negatively charged black particles move and an image corresponding to the latent image is displayed on the electronic paper 100.

The conveyance unit 60 is used for conveying the electronic paper 100. The conveyance unit 60 has a paper cassette 62, a paper feed roller 64 positioned above the paper cassette 62, a conveyance roller 66 positioned on the photoreceptor 20 side of the configuration as viewed from the paper feed roller 64, and a paper discharge roller (not shown). The paper feed roller 64 is a roller for feeding electronic paper 100 stored in the paper cassette 62. The conveyance roller 66 is a roller for conveying electronic paper 100 fed by the paper feed roller 64 into the gap between the first photoreceptor 20a and the first opposing roller 52a, and the gap between the second photoreceptor 20b and the second opposing roller 52b. The discharge roller is a roller for discharging the electronic paper 100 from the image recording device 2 for electronic paper, the electronic paper 100 having displayed images. These rollers are driven by a motor (not shown).

The controller 80 is a control unit (control section) for controlling the image recording device 2 for electronic paper. The controller 80 has an interface section 81, a CPU 82, a memory 83, and a unit control circuit 84.

The interface section 81 transmits and receives data between the image recording device 2 for electronic paper and the host computer, which is an external device. The CPU 82 is an arithmetic processing device for controlling the entire image recording device 2 for electronic paper. The memory 83 is used for providing an area for storing CPU 82 programs, a work area, and other areas; and has a RAM, EEPROM, or the like. The CPU 82 controls each unit via the unit control circuit 84 in accordance with a program stored in the memory 83.

Operation of the Image Recording Device 2

Figure 14:
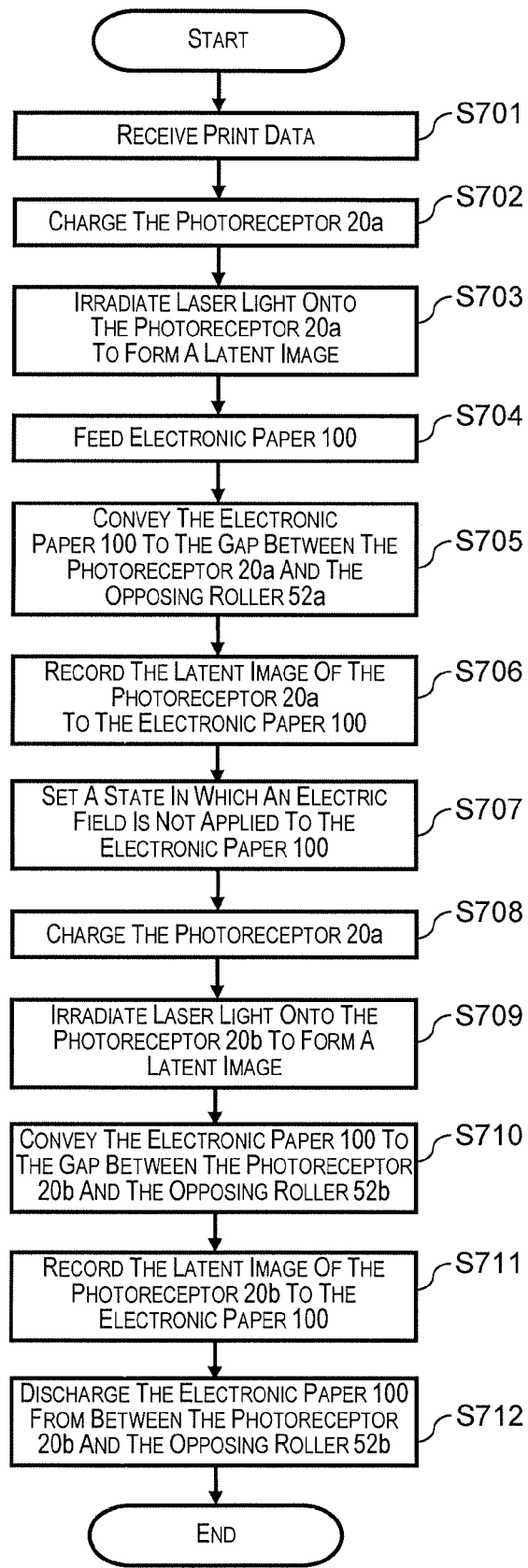
FIG. 14 is a flowchart showing the processing flow carried out by the image recording device 2.

Next, the process in which the image recording device 2 records an image on electronic paper 100 will be described. FIG. 14 is a flowchart showing the processing flow for recording an image as carried out by the image recording device 2. FIGS. 15A to 15F are diagrams for describing the state of charged color particles.

First, the controller 80 of the image recording device 2 receives print data from an external computer (S701), whereupon the first photoreceptor 20a is charged by the first charge roller 31a to −500 V (S702). The controller 80 causes laser light to be irradiated from the first exposure unit 40a onto the first photoreceptor 20a charged to −500 V on the basis of the print data to form a latent image on the first photoreceptor 20a (S703). In other words, a latent image is formed on the first exposure unit 40a by forming a portion charged to −500 V (corresponding to the "first potential") without irradiation of laser light, and a portion set to −50 V (corresponding to the "second potential") by irradiation of laser light.

Figure 15A:
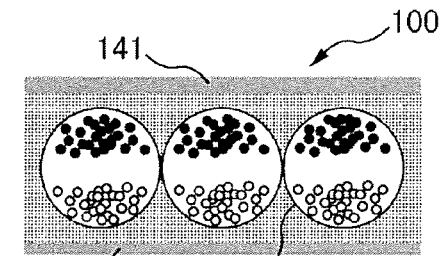
FIG. 15A is a view showing the state of charged color particles for the case in which an electric field is substantially absent before the electronic paper 100 is conveyed into the image recording device 2.

The controller 80 causes the paper feed roller 64 to feed the electronic paper 100 stored in the paper cassette 62 (S704). FIG. 15A is a view showing the state of charged color particles for the case in which an electric field is substantially absent (hereinafter referred to as "electric field-free state") before the electronic paper 100 is conveyed into the image recording device 2.

The controller 80 causes the conveyance unit 60 to convey the electronic paper 100 into the gap between the first photoreceptor 20a and the first opposing roller 52a in sequential fashion from the front end location to the terminal end location (S705). The controller 80 causes the voltage-applying section 54 to apply voltage having a fixed value of −200 V to the first opposing roller 52a to cause an electric field to be generated in the gap between the first photoreceptor 20a and the first opposing roller 52a, cause the front end location to the terminal end location of the electronic paper 100 to be sequentially sandwiched therebetween and have an electric field applied, and cause an image that corresponds to the latent image of the first photoreceptor 20a to be sequentially recorded from the front end location to the terminal end location of the electronic paper 100 (S706). The steps S701 to S706 described above correspond to the first process.

Figure 16A:
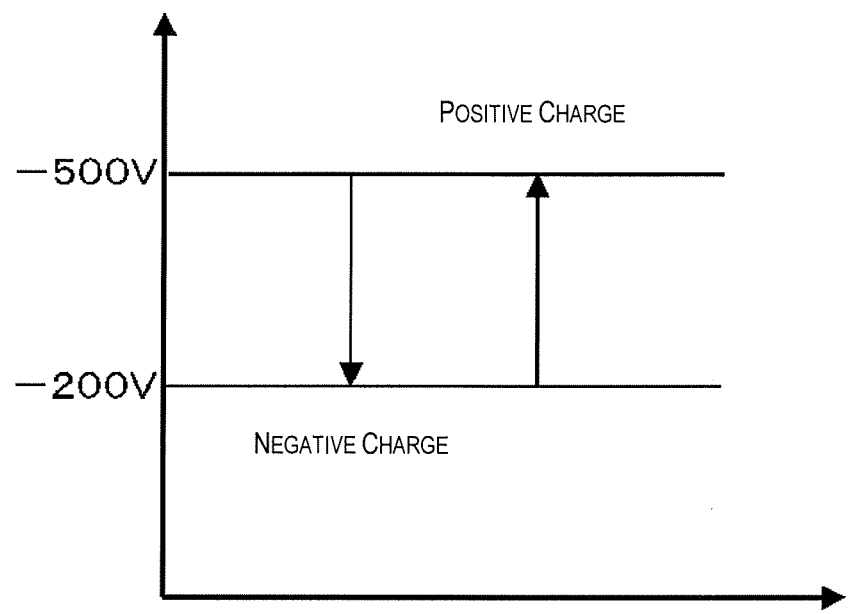
FIG. 16A is a conceptual view showing the mechanism by which an image is recorded in the white image portion of the electronic paper 100.
Figure 16B:
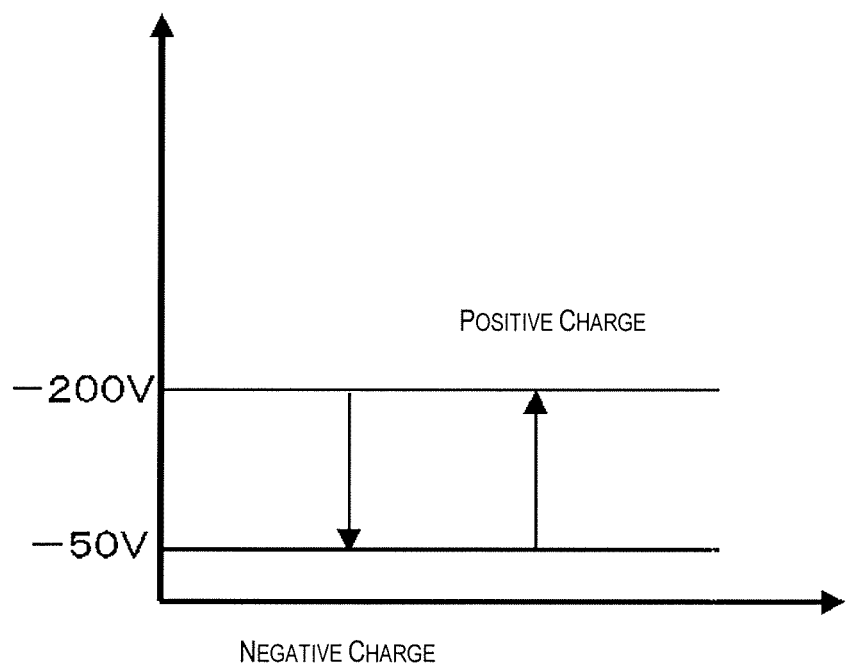
FIG. 16B is a conceptual view showing the mechanism by which an image is recorded in the black image portion of the electronic paper 100.

Here, in S706, the mechanism for recording an image on the electronic paper 100 will be described. FIG. 16A is a conceptual view showing the mechanism by which an image is recorded in the white image portion of the electronic paper 100. FIG. 16B is a conceptual view showing the mechanism by which an image is recorded in the black image portion of the electronic paper 100. An electric field is generated from the first opposing roller 52a (to which −200 V has been applied) toward the first photoreceptor 20a (charged to −500 V) in the gap between the first opposing roller 52a and the portion of the first photoreceptor 20a charged to −500 V, as shown in FIG. 16A. Therefore, the positively charged white particles migrate to the first photoreceptor 20a side (upper insulating layer 141 side) and the negatively charged black particles migrate to the first opposing roller 52a side (lower insulating layer 142 side). In other words, white particles gather on the display surface of the electronic paper 100 and appear as white. On the other hand, an electric field is generated from the first photoreceptor 20a (charged to −500 V) toward the first opposing roller 52a (to which −200 V has been applied) in the gap between the portion of the first photoreceptor 20a charged to −50 V and the first opposing roller 52a, as shown in FIG. 16B. Therefore, the positively charged white particles migrate to the first opposing roller 52a side (lower insulating layer 142 side) and the negatively charged black particles migrate to the first photoreceptor 20a side (upper insulating layer 141 side). In other words, black particles gather on the display surface of the electronic paper 100 and appear as black. In this manner, a portion that appears as black (black image part) and a portion that appears as white (white image part) are formed on the electronic paper 100, that is to say, an image that corresponds to the latent image of the first photoreceptor 20a is recorded.

Figure 15B:
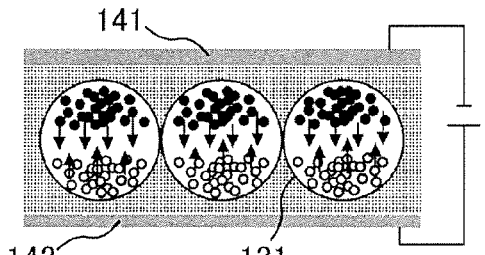
FIG. 15B is a view showing the movement of charged color particles in the location of the electronic paper 100 on which a white image is to be recorded in S705.
Figure 15C:
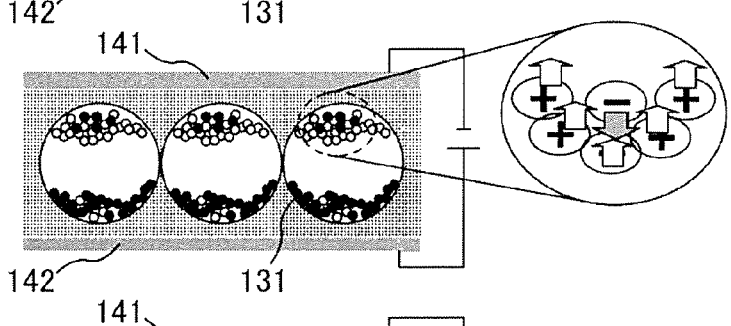
FIG. 15C is a view showing the state of the charged color particles of the electronic paper 100 after the image recorded in S705.

FIG. 15B is a view showing the movement of charged color particles in the location of the electronic paper 100 on which a white image part is to be recorded in S705. When the electronic paper 100 is positioned in the gap between the first photoreceptor 20a and the first opposing roller 52a, the charged color particles come under Coulomb's force and begin electrophoretic movement due to the electric field in the gap between the first photoreceptor 20a and the first opposing roller 52a, as shown in FIG. 15B. FIG. 15C is a view showing the state of the charged color particles of the electronic paper 100 after a white image part has been recorded in S706. A portion of the negatively charged black particles on the upper insulating layer 141 side at the start of electrophoretic movement are surrounded by positively charged white particles during electrophoretic movement to the first opposing roller 52a side and may not be able to escape by Coulomb's force alone, as shown in FIG. 15C. In such a case, a portion of the negatively charged black particles will remain on the upper end side.

Figure 15D:
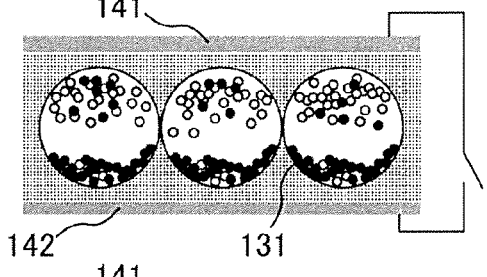
FIG. 15D is a view showing the state of the charged color particles of the electronic paper 100 in an electric field-free state.

The description of the image recording process flow now will continue. The controller 80 causes the first photoreceptor 20a and the first opposing roller 52a to rotate to sequentially discharge the electronic paper 100 beginning from the front end location to the terminal end location from the gap between the first photoreceptor 20a and the first opposing roller 52a and to form a state in which an electric field is substantially absent in each location of the electronic paper 100 (S707). In other words, the electronic paper 100 is discharged from the gap between the first photoreceptor 20a and the first opposing roller 52a in sequential fashion from the front end location to the terminal end location to thereby form a state in the electronic paper 100 in which an electric field, which is produced by the difference in potential between the first photoreceptor 20a and the first opposing roller 52a, is substantially absent (i.e., an electric field-free state). FIG. 15D is a view showing the state of the charged color particles of the electronic paper 100 in an electric field-free state. Since an electric field is substantially absent in an electric field-free state, at least the positively charged white particles and the negatively charged black particles inside the electronic paper 100 do not considerably migrate under the influence of the electric field, as shown in FIG. 15D, but particles disperse due to interparticle repulsive force and surrounded particles can move freely.

The controller 80 causes second photoreceptor 20b to be charged to −500 V by the second charge roller 31b (S708). The controller 80 causes laser light to be irradiated from the second exposure unit 40b onto the second photoreceptor 20b thus charged to −500 V on the basis of the print data to form a latent image on the second photoreceptor 20b (S709). In other words, a latent image is formed on the second photoreceptor 20b by forming a portion charged to −500 V (corresponding to the "first potential") without irradiation of laser light, and a portion set to −50V (corresponding to the "second potential") by irradiation of laser light.

The controller 80 causes the electronic paper 100 to be conveyed by the conveyance unit 60 into the gap between the second photoreceptor 20b and the second opposing roller 52b in sequential fashion from the front end location to the terminal end location (S710). The controller 80 causes a voltage that varies together with time to be applied by the voltage-applying section 54 to the second opposing roller 52b to cause an electric field to be generated in the gap between the second photoreceptor 20b and the second opposing roller 52b, causes the front end location to the terminal end location of the electronic paper 100 to be sequentially sandwiched therebetween and have an electric field applied, and causes an image that corresponds to the latent image of the second photoreceptor 20b to be sequentially recorded from the front end location to the terminal end location of the electronic paper 100 (S711).

Here, the voltage applied to the second opposing roller 52b is in a range that is greater than −500 V (first potential) and less than −50 V (second potential), and the voltage varies together with time. Specifically, the voltage applied to the second opposing roller 52b is a voltage in which an AC voltage has been superimposed on a DC voltage, and the value of the superimposed voltage varies together with time. AC voltage refers to voltage that periodically varies in magnitude and direction together with time.

Figure 17A:
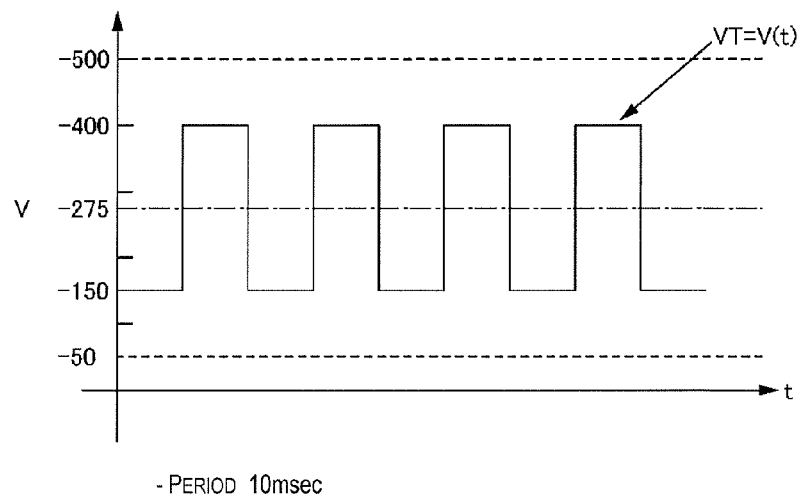
FIGS. 17A to 17I are graphs showing the relationship between time and voltage in relation to the voltage applied to the second opposing roller 52b.
Figure 17B:
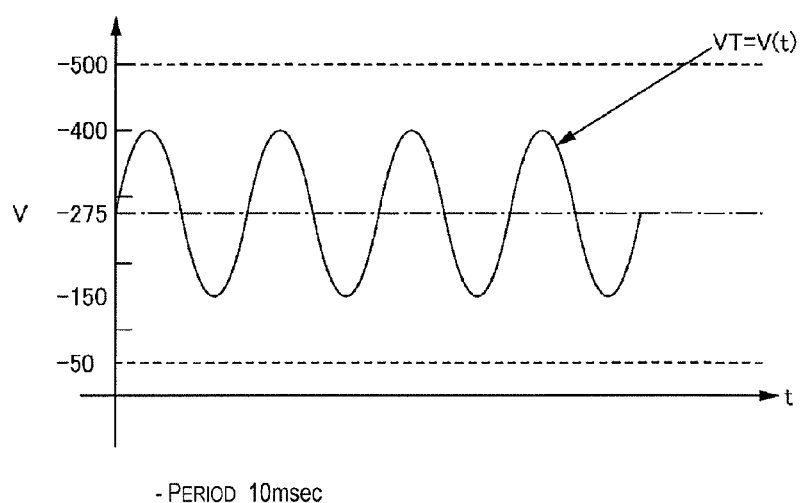
Figure 17C:
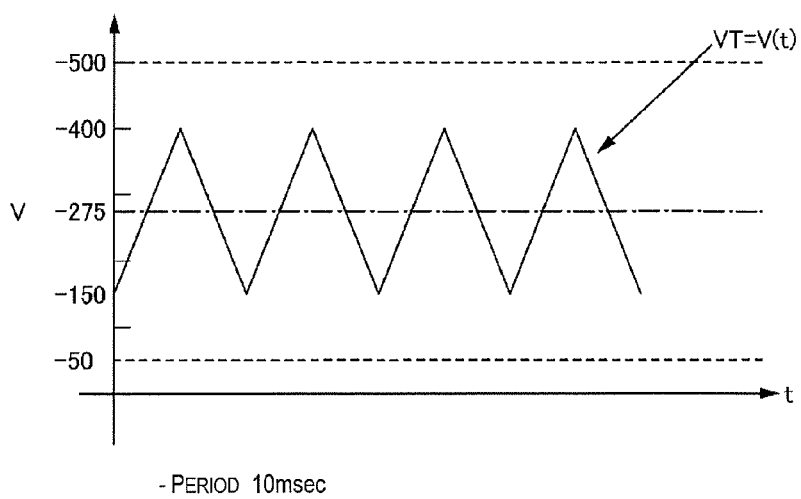
Figure 17D:
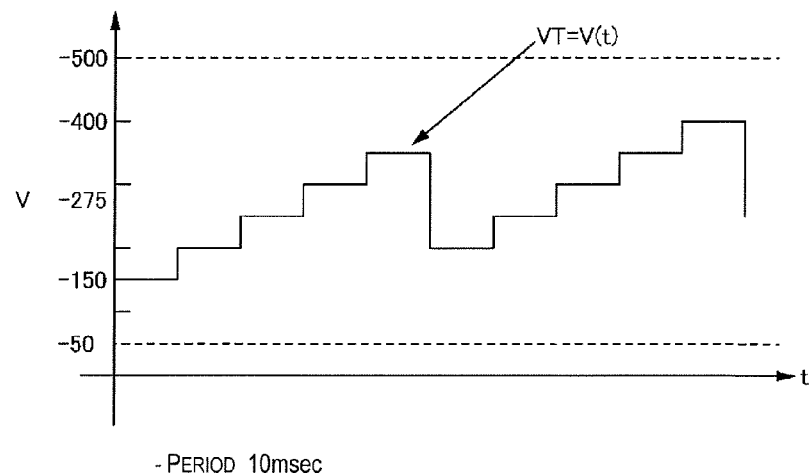
Figure 17E:
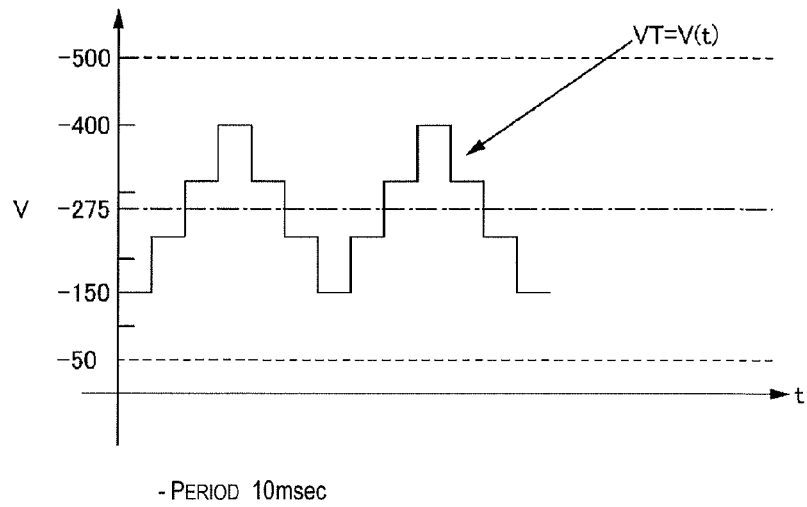
Figure 17F:
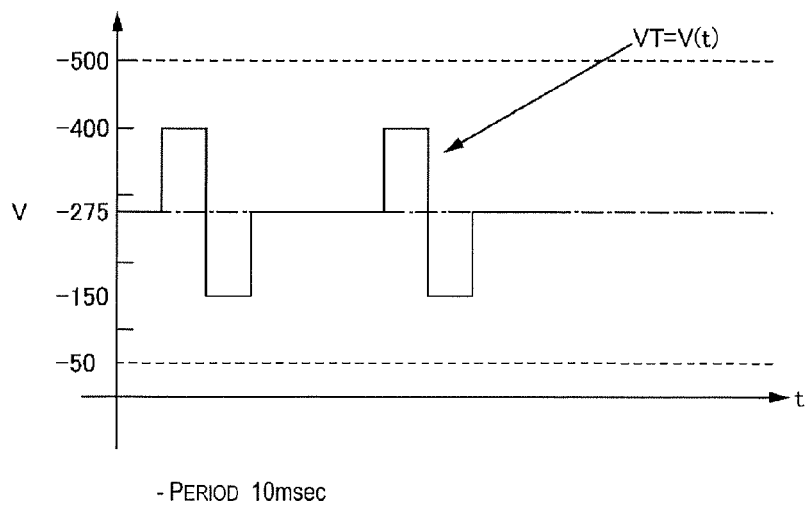
Figure 17G:
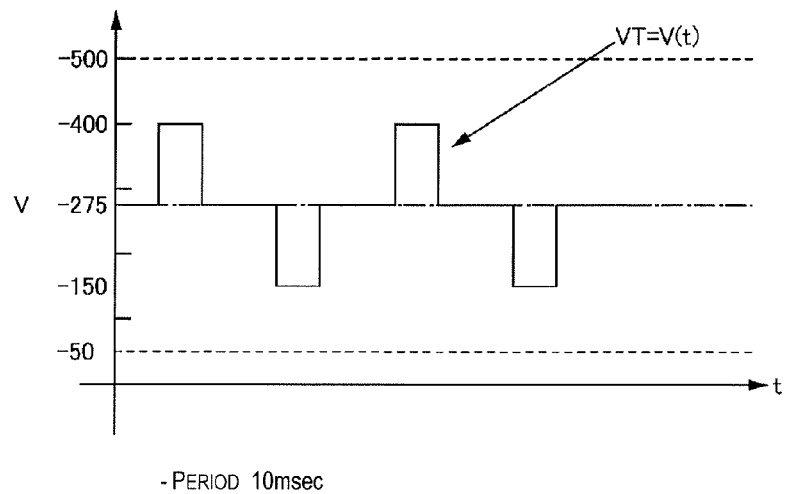
Figure 17H:
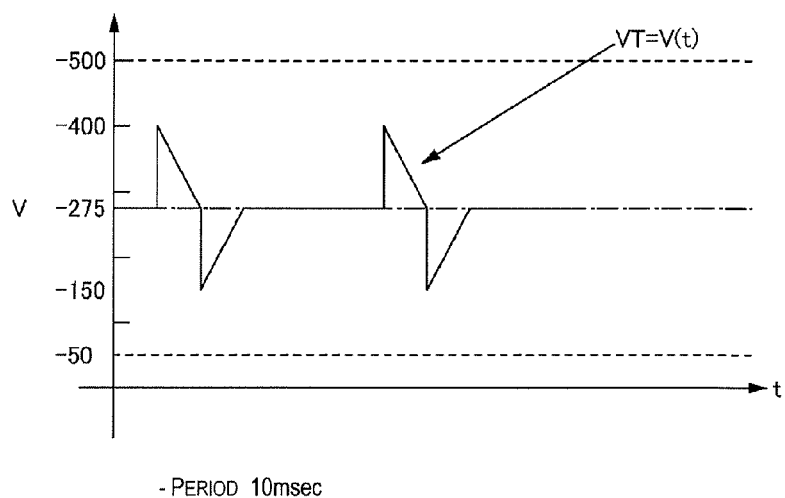
Figure 17I:
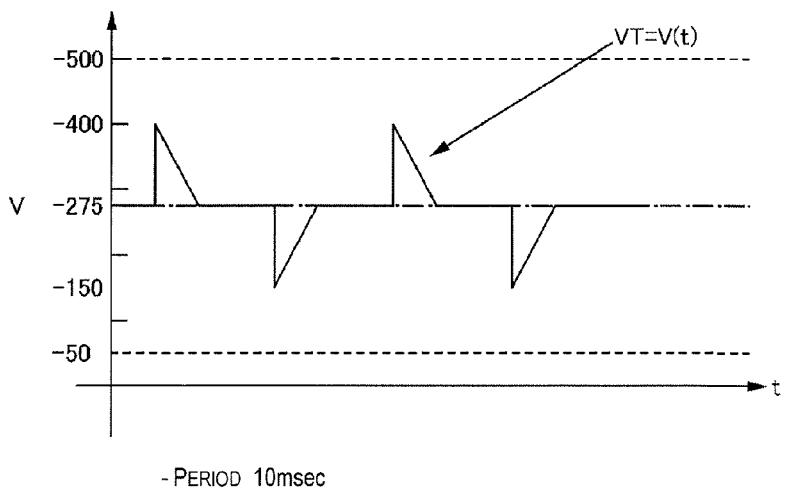

FIG. 17A is a graph showing the relationship between time and voltage in relation to the voltage applied to the second opposing roller 52b. In the present embodiment, the voltage is controlled so as to vary as rectangular waveform voltage in 10 msec periods in which the applied voltage is −150 V in a 5 msec interval and is −400 V in the next 5-msec interval, as shown in FIG. 17A. The period is set to a value that is less than the time required for the locations of the electronic paper 100 to begin and end passing through the nip section (nip width: 5.0 mm) when the electronic paper 100 is conveyed by the conveyance unit 60.

Figure 15E:
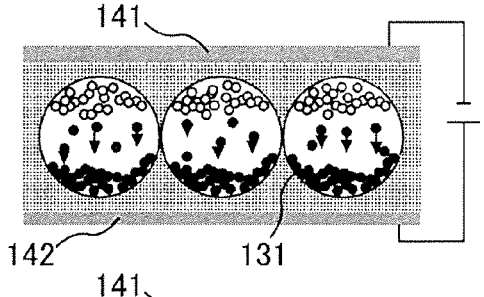
FIG. 15E is a view showing the movement of charged color particles in the locations of the electronic paper 100 on which a white image is to be recorded again in S711.
Figure 15F:
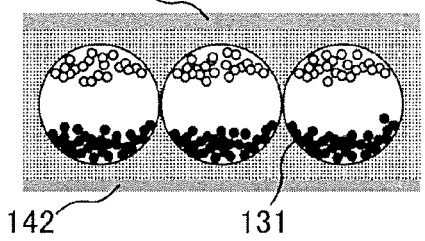
FIG. 15F is a view showing the state of charged color particles of the electronic paper 100 after an image has been recorded in S711.

FIG. 15E is a view showing the migration of charged color particles in the locations of the electronic paper 100 on which a white image is to be recorded again in S711. When the electronic paper 100 is positioned in the gap between the second photoreceptor 20b and the second opposing roller 52b, the charged color particles once dispersed in an electric field-free state in S707 again begin electrophoretic movement under the influence of Coulomb's force due to the electric field in the gap between the second photoreceptor 20b and the second opposing roller 52b, as shown in FIG. 15E. FIG. 15F is a view showing the state of charged color particles of the electronic paper 100 after an image has been recorded in S711. The negatively charged black particles surrounded by the positively charged white particles in the state shown in FIG. 15D escape due to Coulomb's force, whereby the positively charged white particles gather on the upper insulating layer 141 side, and the negatively charged black particles gather on the lower insulating layer 142 side, resulting in adequate separation, as shown in FIG. 15F.

The controller 80 causes the second photoreceptor 20b and the second opposing roller 52b to rotate to sequentially discharge the electronic paper 100 beginning from the front end location to the terminal end location from the gap between the second photoreceptor 20b and the second opposing roller 52b (S712). The steps S707 to S712 described above correspond to the second process.

FIGS. 17B to 17I are graphs showing the relationship between time and voltage in relation to the voltage applied to the second opposing roller 52b in step S711. In the present embodiment, voltage having a waveform such as that shown in FIG. 17A is applied to the second opposing roller 52b in S711. However, the voltage waveform is not limited thereby, and it is also possible to use waveforms such as those shown in FIGS. 17B to 17I, for example.

Usefulness of the Image Recording Device 2

In accordance with the image recording device 2 for electronic paper of the present embodiment, the voltage-applying section 54 is caused to carry out a first process in which the electronic paper 100 is conveyed by the conveyance unit 60, mutually different locations of the electronic paper 100 are sequentially fed into the gap between the first photoreceptor 20a and the first opposing roller 52a, and an image corresponding to the latent image of the first photoreceptor 20a is sequentially displayed in locations on the electronic paper 100 thus fed into the gap. The voltage-applying section 54 is caused to carry out a second process in which the electronic paper 100 is further conveyed by the conveyance unit 60, the locations of the electronic paper 100 temporarily departed from the gap between the first photoreceptor 20a and the first opposing roller 52a are again sequentially fed to a gap between the second photoreceptor 20b and the second opposing roller 52b, and the image corresponding to the latent image in the locations fed to the gap is again sequentially displayed. In accordance with the image recording device 2 for electronic paper, the voltage applied to the first opposing roller 52a is controlled so that the value of the voltage is a fixed value in a range greater than the first potential and less than the second potential when the first process is carried out; and the voltage is controlled so that the value of the voltage varies together with time in a range greater than the first potential and less than the second potential when the second process is carried out. Therefore, the image is displayed on the electronic paper by causing the charged color particles to move in the thickness direction when the first process is carried out; and the charged color particles positioned in an unsuitable position are made to move to a suitable position by causing the intensity of the electric field to vary, and a sharper image can be displayed on the electronic paper when the second process is carried out. The quality of the image recorded on the electronic paper 100 can thereby be improved.

Figure 18A:
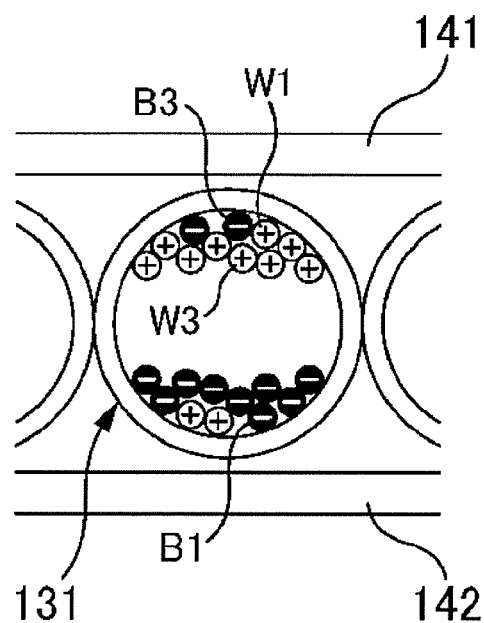
FIG. 18A shows the state of the non-image part of the electronic paper 100 after the first process has been executed.
Figure 18B:
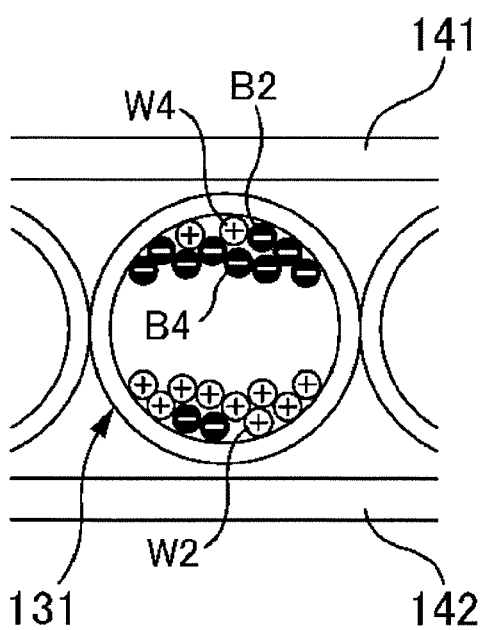
FIG. 18B shows the state of the image part of the electronic paper 100 after the first process has been executed.
Figure 19A:
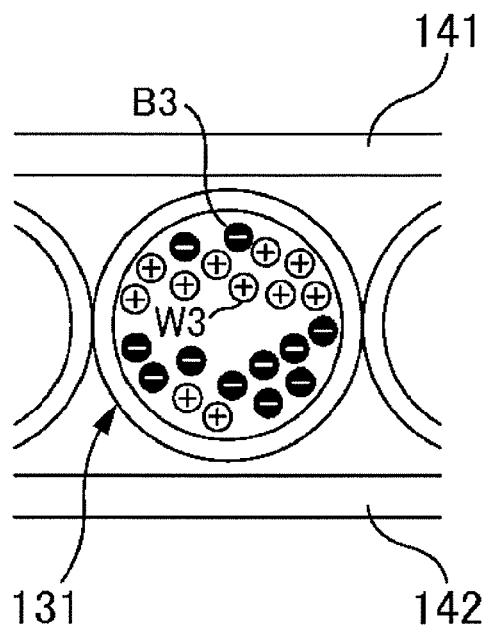
FIG. 19A shows the state of the non-image portion of the electronic paper 100 after the first process and just prior to the second process.
Figure 19B:
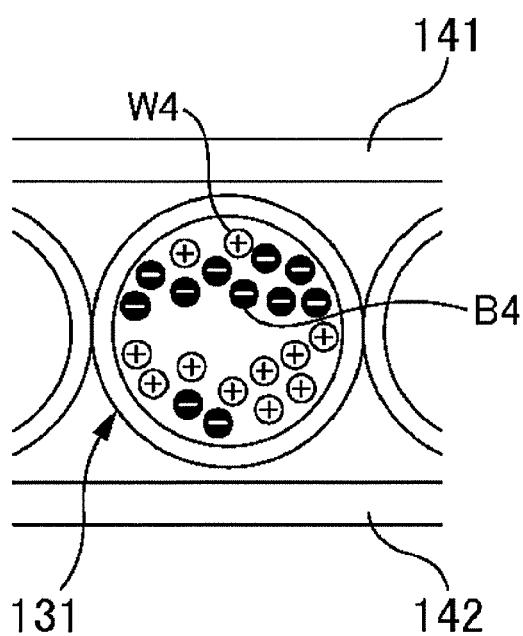
FIG. 19B shows the state of the image portion of the electronic paper 100 after the first process and just prior to the second process.
Figure 20A:
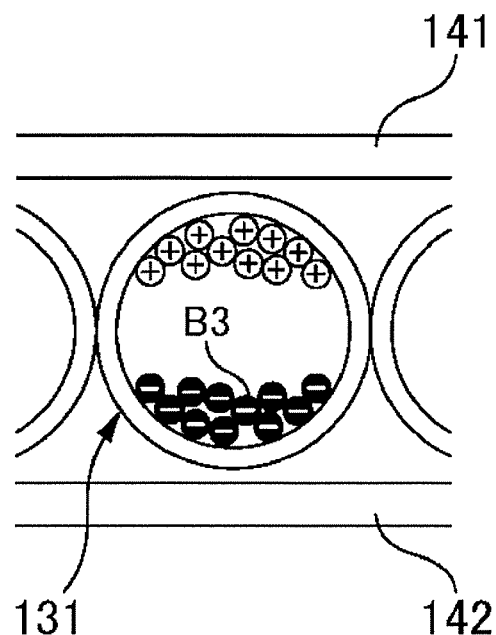
FIG. 20A shows the state of the non-image portion of the electronic paper 100 after the second process has been executed.
Figure 20B:
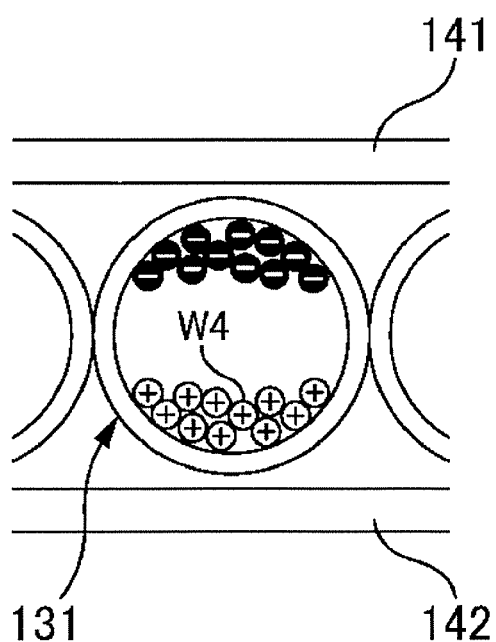
FIG. 20B shows the state of the image portion of the electronic paper 100 after the second process has been executed.

FIGS. 18A to 20B are conceptual views showing the state of the positively charged white particles and the negatively charged black particles of the electronic paper 100. FIG. 18A shows the state of the non-image part of the electronic paper 100 after the first process has been executed. FIG. 18B shows the state of the image part of the electronic paper 100 after the first process has been executed. FIG. 19A shows the state of the non-image portion of the electronic paper 100 after the first process and just prior to the second process. FIG. 19B shows the state of the image portion of the electronic paper 100 after the first process and just prior to the second process. FIG. 20A shows the state of the non-image portion of the electronic paper 100 after the second process has been executed. FIG. 20B shows the state of the image portion of the electronic paper 100 after the second process has been executed.

In the non-image portion of the electronic paper 100, the positively charged white particles W1 can be made to migrate to the upper insulating layer 141 side and the negatively charged black particles B1 can be made to move to the lower insulating layer 142 side by recording an image to the electronic paper 100 using the first photoreceptor 20a and the first opposing roller 52a (first process), as shown in FIG. 18A. Similarly, in the image part of the electronic paper 100, negatively charged black particles B2 can be made to migrate to the upper insulating layer 141 side and positively charged white particles W2 can be made to migrate to the lower insulating layer 142 side, as shown in FIG. 18B. The positively charged white particles and the negatively charged black particles of the electronic paper 100 are thus made to move and an image can be recorded on the electronic paper 100.

However, a portion of the negatively charged black particles B3 is prevented from migrating by the positively charged white particles W3 in the non-image part of the electronic paper 100 in the first process, as shown in FIG. 18A; and negatively charged black particles may stay on the upper insulating layer 141 side, being incapable of migrating to the lower insulating layer 142 side. Here, in the case that the electronic paper 100 is temporarily drawn out from between the first photoreceptor 20a and the first opposing roller 52a in a state in which an electric field is substantially absent (electric field-free state), the negatively charged black particles B3 and the positively charged white particles W3 separate from each other in an "untangled" state due to the interparticle repulsive force, as shown in FIG. 19A. A gap is formed between the negatively charged black particles B3 and the positively charged white particles W3 that were obstructing the negatively charged black particles B3, and the obstruction is released.

Similarly, a portion of the negatively charged black particles B4 is prevented from migrating by the positively charged white particles W4 in the image part of the electronic paper 100 in the first process, as shown in FIG. 18B; and positively charged white particles may stay on the upper insulating layer 141 side, being incapable of migrating to the lower insulating layer 142 side. In a temporary electric field-free state, the negatively charged black particles B3 and the positively charged white particles W3 are affected by interparticle repulsive force, the negatively charged black particles B3 and the positively charged white particles W3 become untangled, a gap is formed between the negatively charged black particles B3 and the positively charged white particles W3 that were obstructing the negatively charged black particles B3, and the obstruction is released, as shown in FIG. 19B.

After the obstruction has been released, the negatively charged black particles B3 which had been obstructed can migrate to the lower insulating layer 142 side in the non-image part, as shown in FIG. 20A, by recording an image to the electronic paper 100 (second process) while varying the magnitude of the electric field between the second photoreceptor 20b and the second opposing roller 52b. In other words, the action of applying Coulomb's force to the negatively charged black particles B3 and the action of weakening Coulomb's force and allowing the interparticle repulsive force to mutually act on the charged color particles are repeated in alternating fashion by varying the magnitude of the electric field when the second process is carried out, and the negatively charged black particles B3 can be made to reliably move in gradual fashion to their proper positions. In other words, in the second process, the charged color particles can be made to reliably migrate to their proper positions by alternating between moving the charged color particles and untangling using interparticle repulsive force. The quality of images recorded to the electronic paper 100 can thus be improved.

Similarly, in the image part, the obstructed positively charged white particles W4 can be made to migrate to the lower insulating layer 142 side, as shown in FIG. 20B.

In accordance with the image recording device 2 for electronic paper, the voltage-applying section 54 applies a voltage having a fixed value (−200 V) that is greater than the first potential (−500 V) and less than the second potential (−50 V) to the first opposing roller 52a when the electronic paper 100 is positioned in the gap between the first photoreceptor 20a and the first opposing roller 52a. The voltage-applying section 54 applies voltage to the second opposing roller 52b so that the value varies in a range greater than the first potential (−500 V) and less than the second potential (−50 V) when the electronic paper 100 is positioned between the second photoreceptor 20b and the second opposing roller 52b, whereby the quality of an image recorded to the electronic paper 100 can be improved. In other words, the intensity of the electric field is varied to cause the magnitude of the force to vary without changing the direction of the force applied to the charged color particles in the thickness direction, whereby the charged color particles positioned in an unsuitable position are made to move to a suitable position, and a sharper image can be displayed on the electronic paper when the second process is carried out.

Embodiment 5

An image recording device 2A (not shown) for recording an image onto electronic paper 100 as a medium for displaying an image will be described in embodiment 5 below. Embodiment 5 differs from embodiment 4 in the manner in which the voltage applied to the second opposing roller 52b is made to vary when the second process is carried out in the image recording device 2A. The configuration of the image recording device 2A is the same as the image recording device 2 of embodiment 4.

Figure 21A:
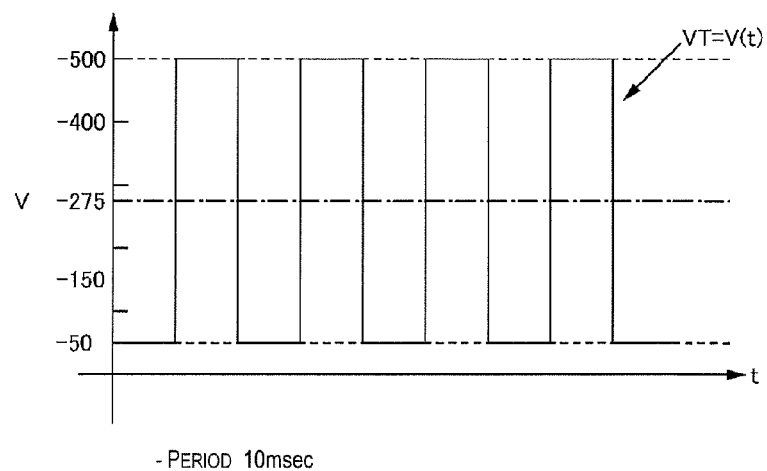
FIGS. 21A to 21I are graphs showing the relationship between time and voltage in relation to the voltage applied to the second opposing roller 52b.
Figure 21B:
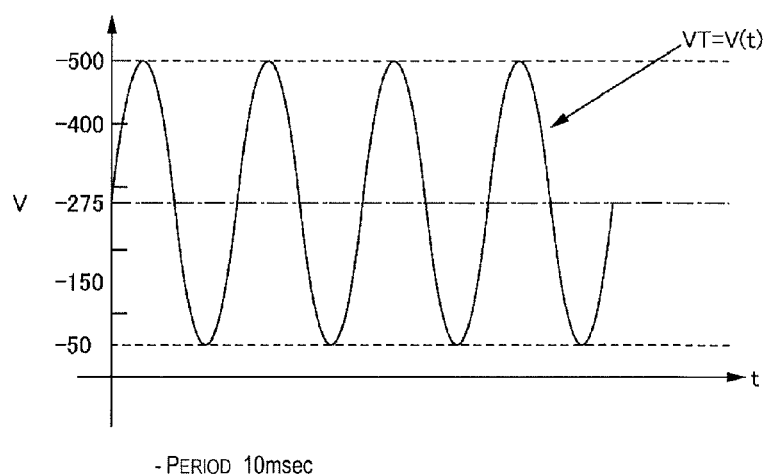
Figure 21C:
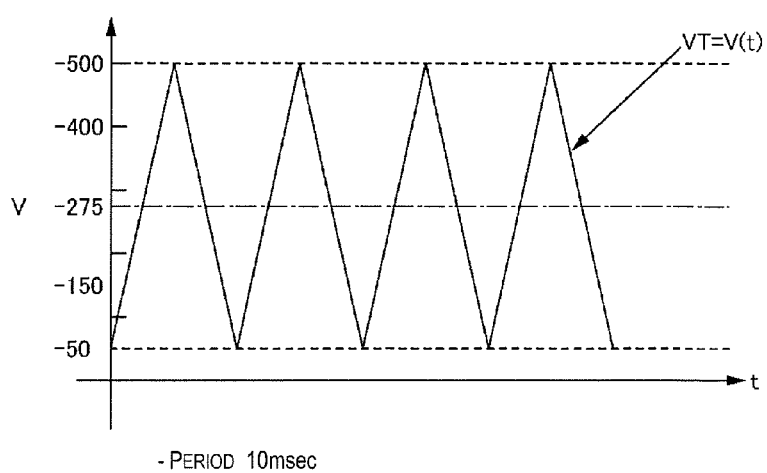
Figure 21D:
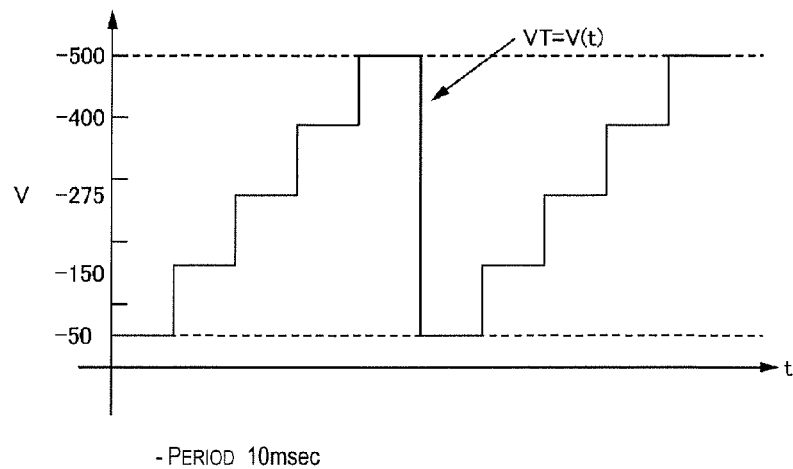
Figure 21E:
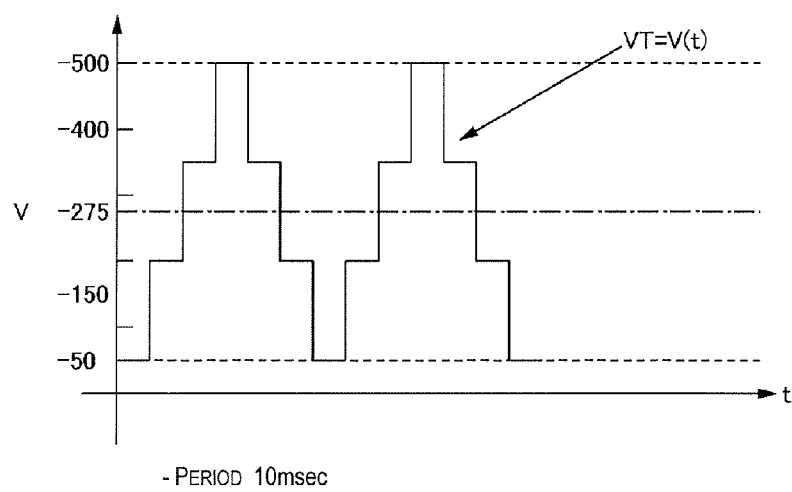
Figure 21F:
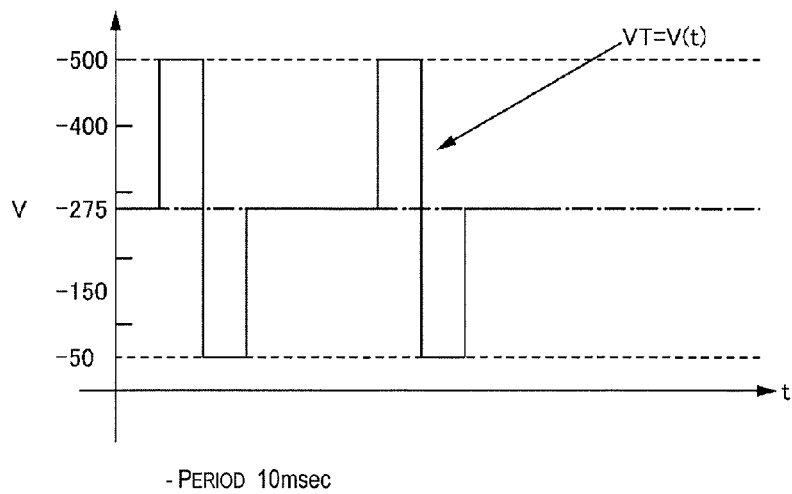
Figure 21G:
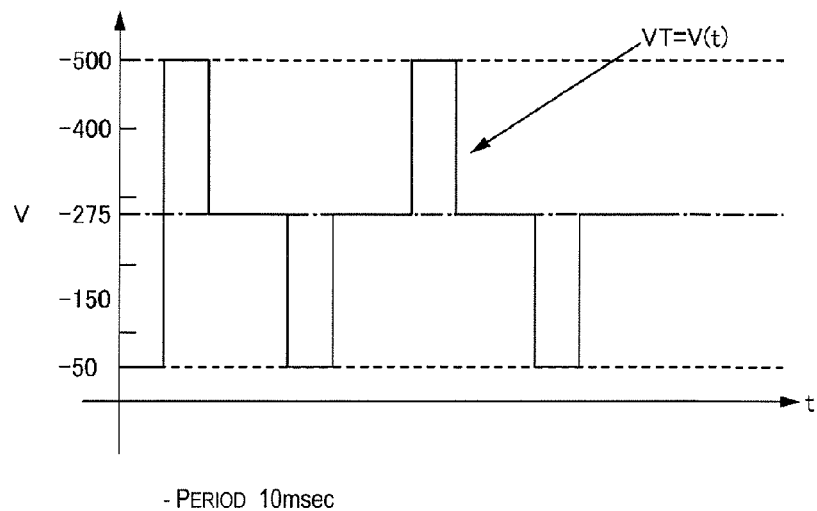
Figure 21H:
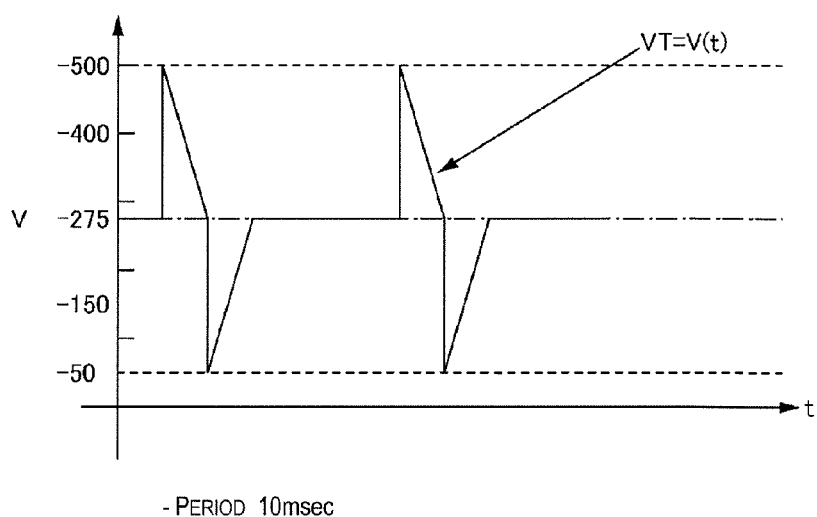
Figure 21I:
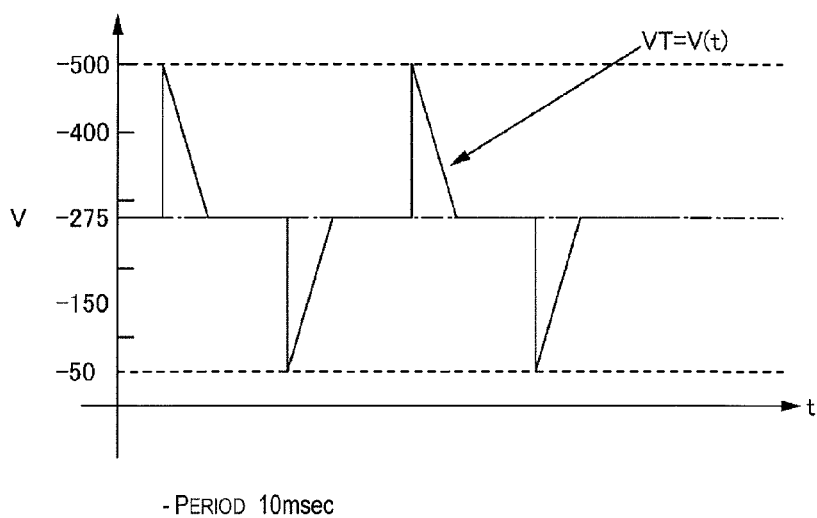

FIG. 21A is a graph showing the relationship between time and voltage in relation to the voltage applied to the second opposing roller 52b in S711. In the present embodiment, the voltage is controlled so as to vary as a rectangular waveform voltage in 10 msec periods in which the applied voltage is −50 V in a 5 msec interval and is −500 V in the next 5-msec interval, as shown in FIG. 21A.

In the interval when the voltage applied to the second opposing roller 52b is −50 V, there is no difference in potential between the second opposing roller 52b and the portion (image portion) set to −50 V on the second photoreceptor 20b, and an electric field is not generated. Therefore, during this interval, the interparticle repulsive force operates and the charged color particles separate from each other. Since there is a difference in potential (450 V) between the second opposing roller 52b and the portion (non-image portion) set to −500 V on the second photoreceptor 20b and an electric field is generated, the negatively charged black particles can be made to migrate to the second opposing roller 52b side (lower insulating layer 142 side) and the positively charged white particles can be made to move to the second photoreceptor 20b side (upper insulating layer 141 side) due to Coulomb's force.

On the other hand, in the interval when the voltage applied to the second opposing roller 52b is −500 V, there is no difference in potential between the second opposing roller 52b and the portion (non-image portion) set to −500 V on the second photoreceptor 20b, and an electric field is not generated. Therefore, during this interval, the interparticle repulsive force operates and the charged color particles separate from each other. Since there is a difference in potential (450 V) between the second opposing roller 52b and the portion (image portion) set to −50 V on the second photoreceptor 20b and an electric field is generated, the negatively charged black particles can be made to move to the second photoreceptor 20b side (upper insulating layer 141 side) and the positively charged white particles can be made to move to the second opposing roller 52b side (lower insulating layer 142 side) due to Coulomb's force.

FIGS. 21B to 21I are graphs showing the relationship between time and voltage in relation to the voltage applied to the second opposing roller 52b in S711. In the present embodiment, voltage that varies in a rectangular waveform such as that shown in FIG. 21A is applied to the second opposing roller 52b in S711. However, the voltage waveform is not limited thereto, it also being possible to use waveforms such as those shown in FIGS. 21B to 21I, for example (sinusoidal waves, triangular waves, sawtooth waves, and the like).

Usefulness of the Image Recording Device 2A

In accordance with the image recording device 2A for electronic paper, the quality of an image recorded to electronic paper can be improved by controlling the voltage applied to the opposing member so that the value of the voltage is a fixed value in a range greater than the first potential and less than the second potential when the first process is carried out, and controlling the voltage so that the value of the voltage varies together with time and so that the value of the voltage is equal to or less than the first potential at a minimum value and equal to or greater than a second potential at a maximum value when the second process is carried out. In other words, an image is displayed on the electronic paper by causing the charged color particles to migrate in the thickness direction when the first process is carried out; and by allowing Coulomb's force and the interparticle repulsive force to act on the charged color particles in alternating fashion when the second process is carried out. The charged color particles positioned in unsuitable positions can thereby be made to move to suitable positions.

Embodiment 6

An image recording device 2B (not shown) for recording an image onto electronic paper 100 as a medium for displaying an image will be described in embodiment 6 below. Embodiment 6 differs from embodiments 4 and 5 in the manner in which the voltage applied to the second opposing roller 52b is made to vary when the second process is carried out in the image recording device 2B. The configuration of the image recording device 2B is the same as the image recording device 2 and the image recording device 2A.

Figure 22A:
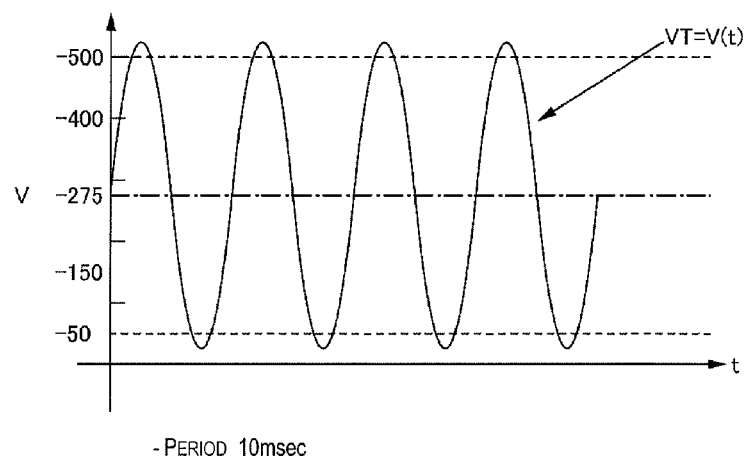
FIGS. 22A to 22I are graphs showing the relationship between time and voltage in relation to the voltage applied to the second opposing roller 52b.
Figure 22B:
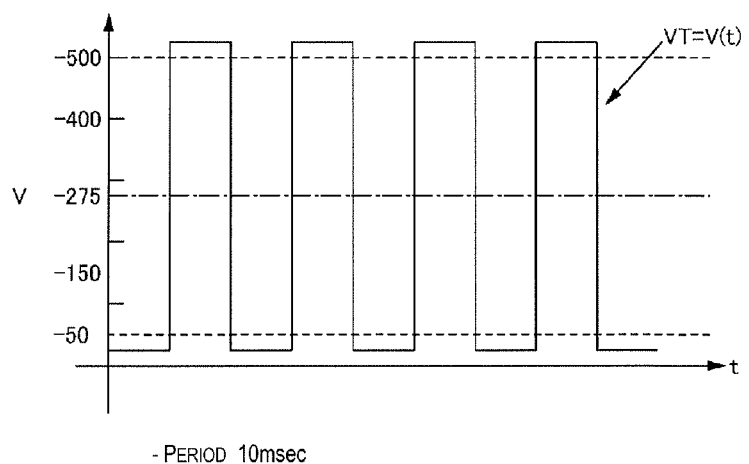
Figure 22C:
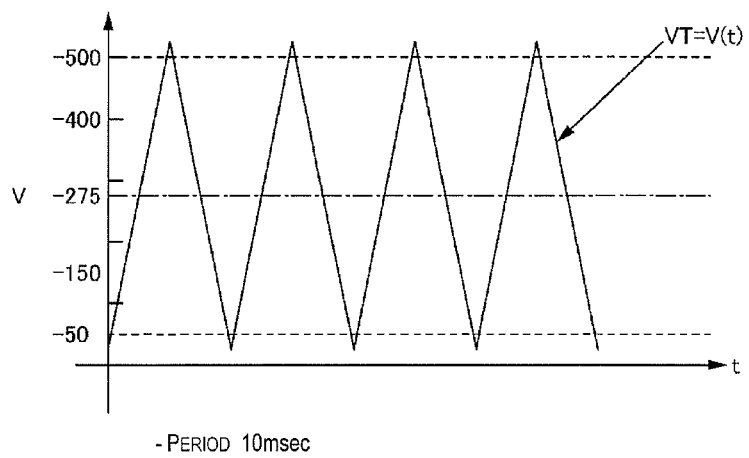
Figure 22D:
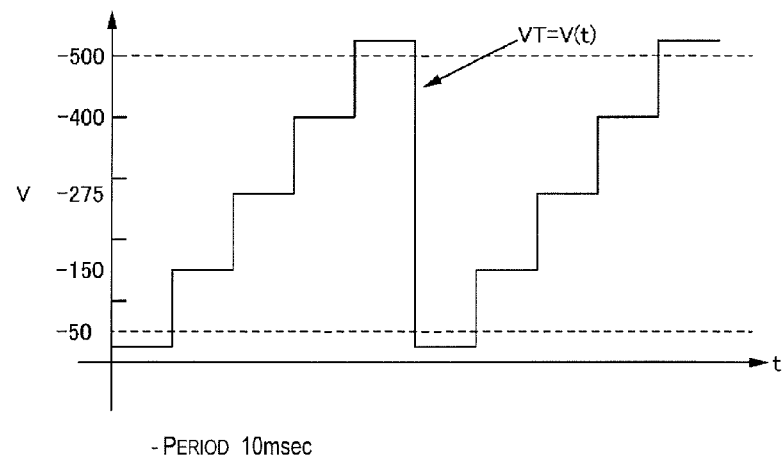
Figure 22E:
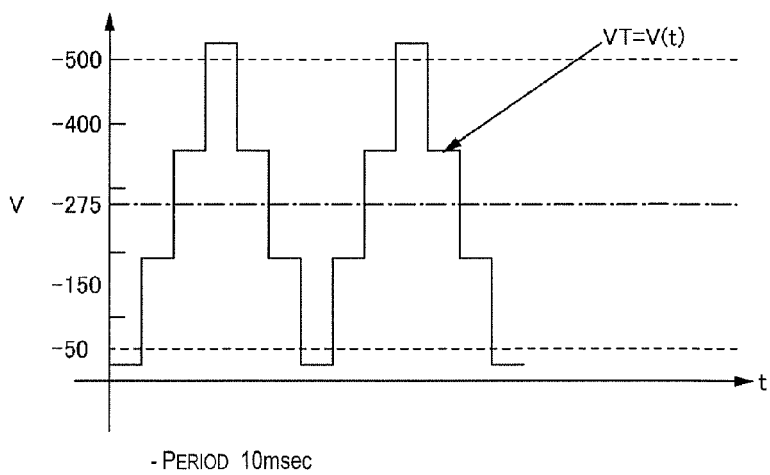
Figure 22F:
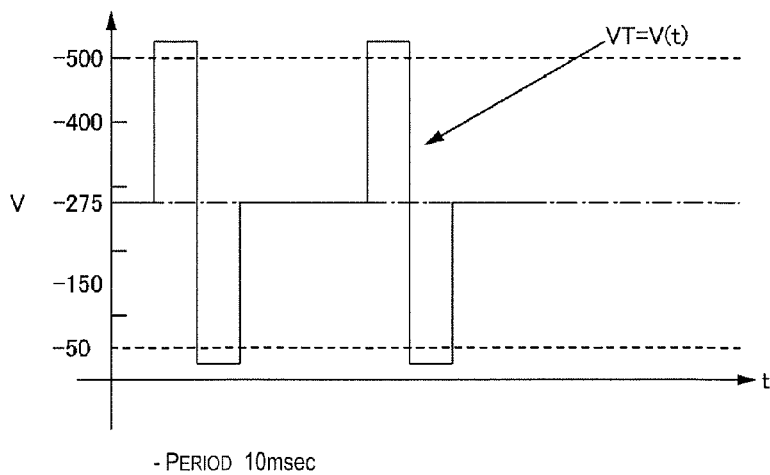
Figure 22G:
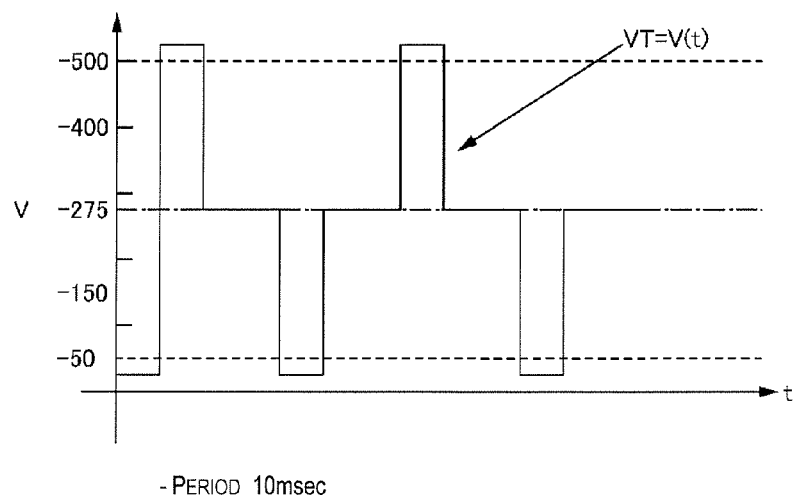
Figure 22H:
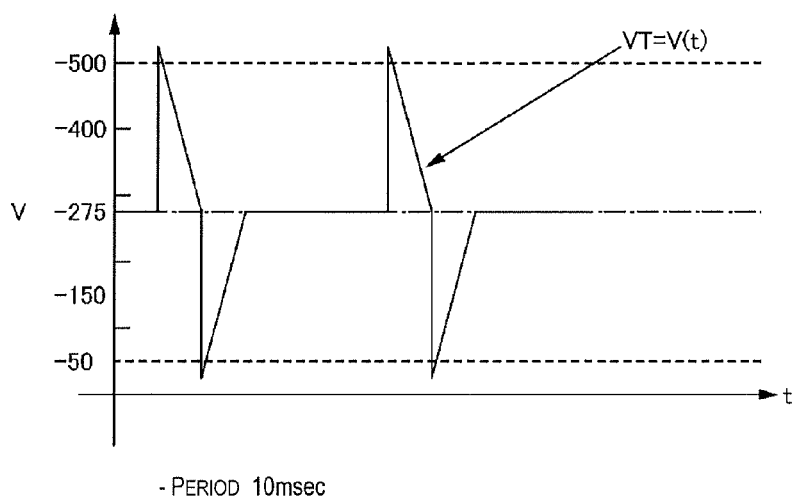
Figure 22I:
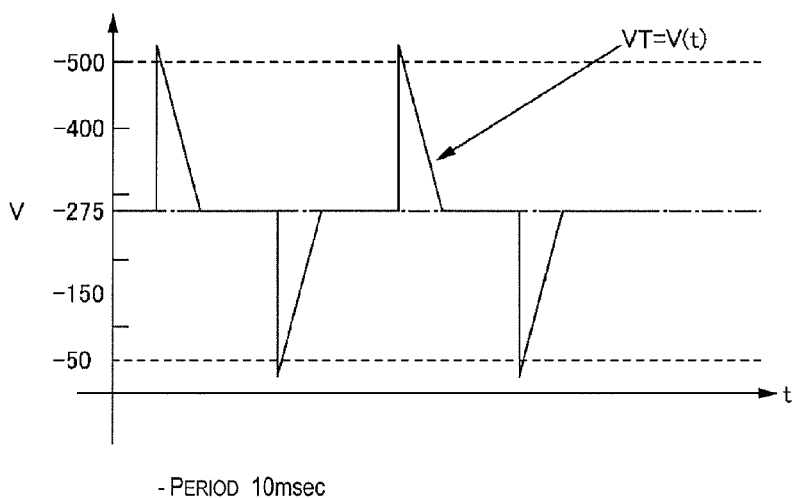

FIG. 22A is a graph showing the relationship between time and voltage in relation to the voltage applied to the second opposing roller 52b in S711. In embodiment 6, the voltage to be applied is controlled by varying the voltage between −30 V and −520 V in 10 msec periods using a sinusoidal waveform.

When the voltage to be applied to the second opposing roller 52b is between −50 V and −500 V, an electric field is generated between the second opposing roller 52b and the portion (non-image portion) set to −500 V on the second photoreceptor 20b. Therefore, the negatively charged black particles can be made to move to the second opposing roller 52b side (lower insulating layer 142 side) and the positively charged white particles can be made to move to the second photoreceptor 20b (upper insulating layer 141 side) due to Coulomb's force. Also, since an electric field is generated between the second opposing roller 52b and the portion (image portion) set to −50 V on the second photoreceptor 20b, the negatively charged black particles can be made to move to the second photoreceptor 20b side (upper insulating layer 141 side) and the positively charged white particles can be made to move to the second opposing roller 52b side (lower insulating layer 142 side) due to Coulomb's force.

On the other hand, in the interval when the voltage applied to the second opposing roller 52b is greater than −50 V for a short period of time, the electric field is inverted between the second opposing roller 52b and the portion (image portion) set to −50 V on the second photoreceptor 20b. The positively charged white particles and the negatively charged black particles between the second opposing roller 52b and the portion (image portion) set to −50 V on the second photoreceptor 20b can thereby be made to move in the opposite direction to the proper direction for a short period of time. When the voltage applied to the second opposing roller 52b is again set to between −50 V and −500 V, the positively charged white particles and the negatively charged black particles can be made to move in their proper directions as described above.

In the interval when the voltage applied to the second opposing roller 52b is less than −500 V for a short period of time, the electric field is inverted between the second opposing roller 52b and the portion (image portion) set to −500 V on the second photoreceptor 20b. The positively charged white particles and the negatively charged black particles between the second opposing roller 52b and the portion (image portion) set to −500 V on the second photoreceptor 20b can thereby be made to migrate in the opposite direction to the proper direction for a short period of time. When the voltage applied to the second opposing roller 52b is again set to between −50 V and −500 V, the positively charged white particles and the negatively charged black particles can be made to migrate in their proper directions as described above.

The controller 80 thus essentially increases the voltage applied to the second opposing roller 52b to be greater than −50 V and reduces the voltage to be applied to the second opposing roller 52b to be less than −500 V for a short period of time in periods of 10 msec while keeping the voltage applied to the second opposing roller 52b to between −50 V and −500 V.

FIGS. 22B to 22I are graphs showing the relationship between time and voltage in relation to the voltage applied to the second opposing roller 52b in S711. In the present embodiment, voltage that varies in a sinusoidal waveform such as that shown in FIG. 22A is applied to the second opposing roller 52b in S711. However, the voltage waveform is not limited thereto, and it is also possible to use waveforms such as those shown in FIGS. 22B to 22I, for example (rectangular waves, triangular waves, sawtooth waves, and the like).

Usefulness of the Image Recording Device 2B

In accordance with the image recording device 2B for electronic paper, the quality of an image recorded to electronic paper can be improved by controlling the voltage applied to the opposing member so that the value of the voltage is fixed in a range greater than the first potential and less than the second potential when the first process is carried out, and controlling the voltage so that the value of the voltage varies together with time and so that the value of the voltage is less than the first potential at a minimum value and greater than a second potential at a maximum value when the second process is carried out. In other words, the intensity of the electric field is varied to cause the magnitude of the force to vary while changing the direction of the force applied to the charged color particles in the thickness direction, whereby the charged color particles positioned in an unsuitable position are jostled and made to move to a suitable position when the second process is carried out.

Embodiment 7

Figure 23:
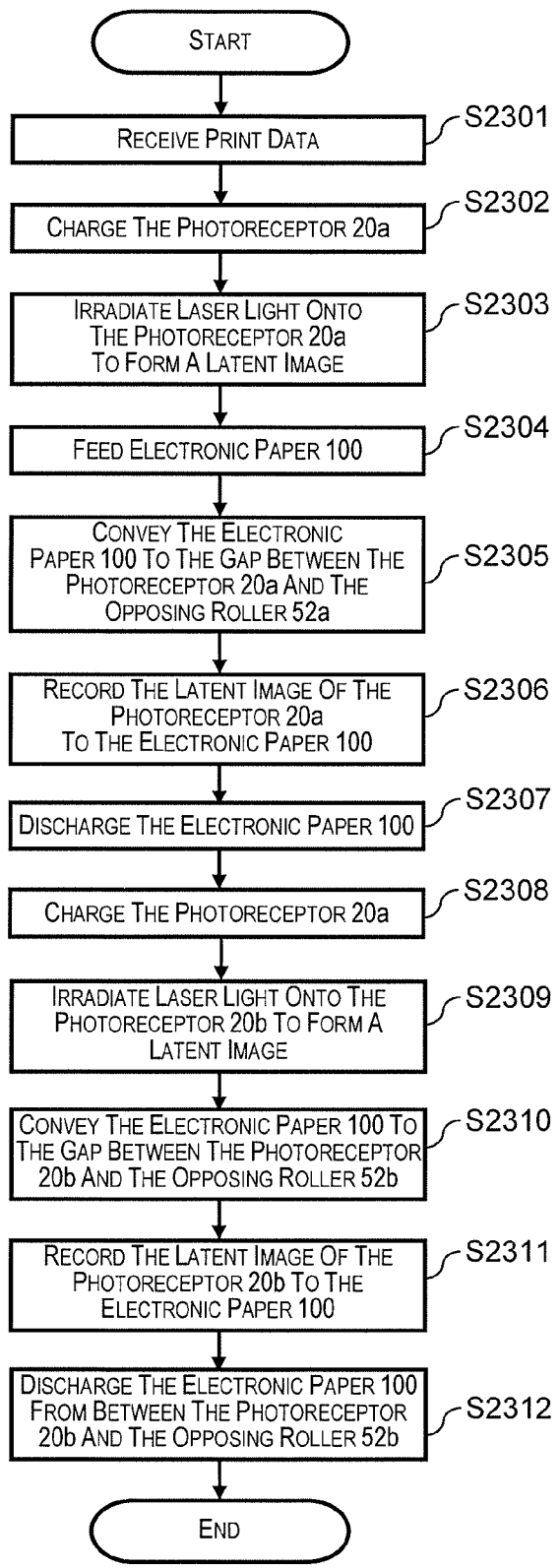
FIG. 23 is a flowchart showing the processing flow for recording an image carried out by the image recording device 2C.

An image recording device 2C (not shown) for recording an image onto electronic paper 100 as a medium for displaying an image will be described in embodiment 7 below. FIG. 23 is a flowchart showing the processing flow for recording an image carried out by the image recording device 2C. In the image recording devices 2, 2A, and 2B of embodiments 4, 5, and 6, the value of the voltage is kept at a fixed value when the first process is carried out, and the value of the voltage is varied together with time when the second process is carried out, but the image recording device 2C in embodiment 7 differs in that the specification of voltage control is different. The configuration of the image recording device 2C is the same as the image recording devices 2, 2A, 2B.

Operation of the Image Recording Device 2C

The process in which the image recording device 2C records an image on electronic paper 100 will now be described. First, the controller 80 of the image recording device 2C receives print data from an external computer (S2301), whereupon the first photoreceptor 20a is charged by the first charge roller 31a to −500 V (S2302). The controller 80 causes laser light to be irradiated from the first exposure unit 40a onto the first photoreceptor 20a charged to −500 V on the basis of the print data to form a latent image on the first photoreceptor 20a (S2303). In other words, a latent image is formed on the first exposure unit 40a by forming a portion charged to −500 V (corresponding to the "first potential") without laser light irradiation, and a portion set to −50 V (corresponding to the "second potential") by laser light irradiation. The controller 80 causes the paper feed roller 64 to feed the electronic paper 100 stored in the paper cassette 62 (S2304). The controller 80 causes the conveyance unit 60 to convey the electronic paper 100 into the gap between the first photoreceptor 20a and the first opposing roller 52a in sequential fashion from the front end location to the terminal end location (S2305). The controller 80 causes the voltage-applying section 54 to apply voltage that varies together with time to the first opposing roller 52a to cause an electric field to be generated in the gap between the first photoreceptor 20a and the first opposing roller 52a, cause the front end location to the terminal end location of the electronic paper 100 to be sequentially sandwiched therebetween and have an electric field applied, and cause an image that corresponds to the latent image of the first photoreceptor 20a to be sequentially recorded from the front end location to the terminal end location of the electronic paper 100 (S2306).

The controller 80 controls the voltage applied to the first opposing roller 52a so that the voltage varies in a sinusoidal waveform in periods of 10 msec between −30 V and −520 V, as shown in FIG. 22A. The period is set to a value that is less than the time required for the locations of the electronic paper 100 to begin and end passing through the nip section (nip width: 5.0 mm) when the electronic paper 100 is conveyed by the conveyance unit 60. The voltage applied to the first opposing roller 52a is a voltage in which an AC voltage has been superimposed on a DC voltage, and the value of the superimposed voltage varies together with time. AC voltage refers to voltage that periodically varies in magnitude and direction together with time. Steps S2301 to S2306 described above correspond to the first process.

The controller 80 causes the first photoreceptor 20a and the first opposing roller 52a to rotate to sequentially discharge the electronic paper 100 beginning from the front end location to the terminal end location from the gap between the first photoreceptor 20a and the first opposing roller 52a (S2307). The controller 80 causes second photoreceptor 20b to be charged to −500 V by the second charge roller 31b (S2308). The controller 80 causes laser light to be irradiated from the second exposure unit 40b onto the second photoreceptor 20b thus charged to −500 V on the basis of the print data to form a latent image on the second photoreceptor 20b (S2309). In other words, a latent image is formed on the second photoreceptor 20b by forming a portion charged to −500 V (corresponding to the "first potential") without irradiation of laser light, and a portion set to −50 V (corresponding to the "second potential") by irradiation of laser light.

The controller 80 causes the electronic paper 100 to be conveyed by the conveyance unit 60 into the gap between the second photoreceptor 20b and the second opposing roller 52b in sequential fashion from the front end location to the terminal end location (S2310). The controller 80 causes voltage having a fixed value (−200 V) to be applied by the voltage-applying section 54 to the second opposing roller 52b to cause an electric field to be generated in the gap between the second photoreceptor 20b and the second opposing roller 52b, causes the front end location to the terminal end location of the electronic paper 100 to be sequentially sandwiched therebetween and have an electric field applied, and causes an image that corresponds to the latent image of the second photoreceptor 20b to be sequentially recorded from the front end location to the terminal end location of the electronic paper 100 (S2311).

The controller 80 causes the second photoreceptor 20b and the second opposing roller 52b to rotate to sequentially discharge the electronic paper 100 beginning from the front end location to the terminal end location from the gap between the second photoreceptor 20b and the second opposing roller 52b (S2312). The steps S2307 to S2312 described above correspond to the second process.

In the image recording device 2C, a voltage that varies in a sinusoidal waveform such as that shown in FIG. 22A is applied to the first opposing roller 52a in S2306. However, the voltage waveform is not limited thereby, and it is also possible to use waveforms such as those shown in FIGS. 22B to 22I (e.g., sinusoidal waves, triangular waves, sawtooth waves, and the like).

Usefulness of the Image Recording Device

In accordance with the image recording device 2C for electronic paper, the voltage-applying section 54 is caused to carry out a first process in which the electronic paper 100 is conveyed by the conveyance unit 60, mutually different locations of the electronic paper 100 are sequentially fed into the gap between the first photoreceptor 20a and the first opposing roller 52a, and an image corresponding to the latent image of the first photoreceptor 20a is sequentially displayed in locations on the electronic paper 100 thus fed into the gap. The voltage-applying section 54 is caused to carry out a second process in which the electronic paper 100 is further conveyed by the conveyance unit 60, the locations of the electronic paper 100 having just come out from the gap between the first photoreceptor 20a and the first opposing roller 52a are again sequentially fed to a gap between the second photoreceptor 20b and the second opposing roller 52b, and the image corresponding to the latent image in the locations fed to the gap is again sequentially displayed. In accordance with the image recording device 2 for electronic paper, the voltage applied to the opposing member is controlled so that the value of the voltage varies together with time in a range less than the first potential at a minimum value and greater than the second potential at a maximum value when the first process is carried out; and the voltage is controlled so that the value of the voltage is a fixed value in a range greater than the first potential and less than the second potential when the second process is carried out. The quality of an image recorded on the electronic paper can thereby be improved. In other words, the intensity of the electric field is varied to cause the magnitude of the force to vary while changing the direction of the force applied to the charged color particles in the thickness direction when the first process is carried out, whereby the image can be recorded while reducing the obstruction of the movement of a portion of the charged color particles by other charged color particles. The density of the gathered positively charged white particles and negatively charged black particles can be each increased by carrying out the second process. A sharper image can thereby be displayed on the electronic paper.

More specifically, in accordance with the image recording device 2C for electronic paper, the voltage-applying section 54 applies to the first opposing roller 52a a voltage (−200 V) that varies in a range less than the first potential (−500 V) and greater than the second potential (−50 V) when the electronic paper 100 is positioned in the gap between the first photoreceptor 20a and the first opposing roller 52a. Also, the voltage-applying section 54 applies to the second opposing roller 52b a voltage having a fixed value in a range greater than the first potential (−500 V) and less than the second potential (−50 V) when the electronic paper 100 is positioned in the gap between the second photoreceptor 20b and the second opposing roller 52b. The quality of an image recorded on the electronic paper can thereby be improved.

Embodiment 8

Figure 24:
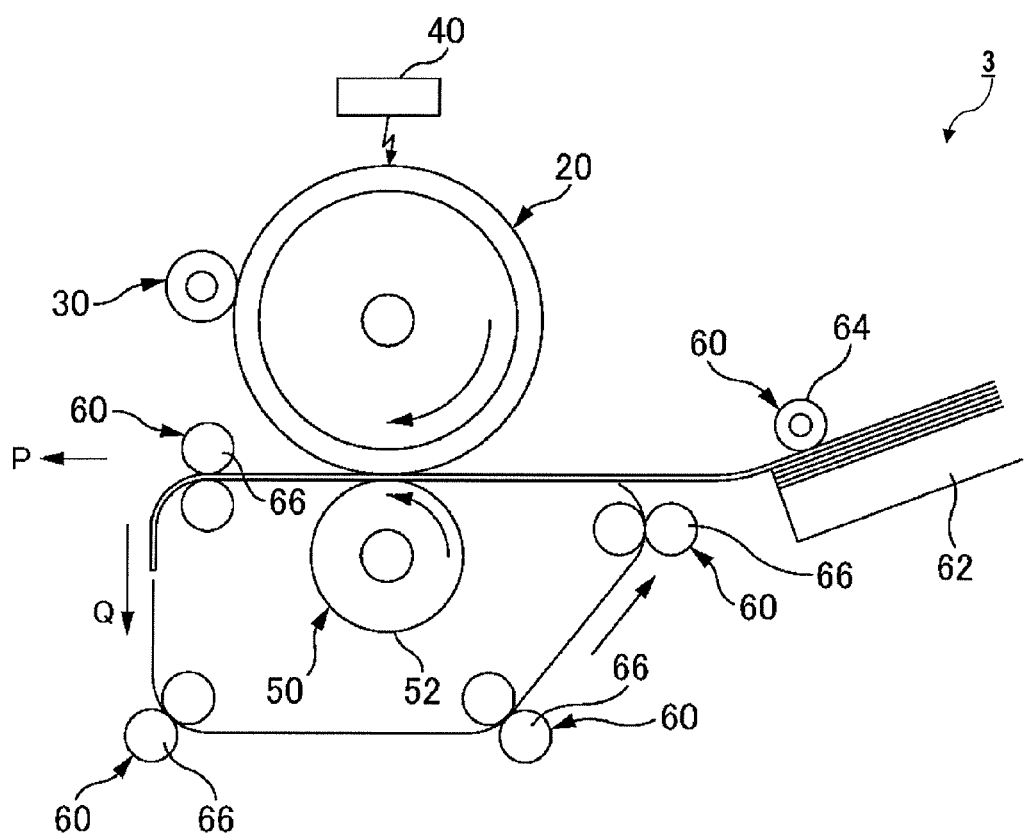
FIG. 24 is a cross-sectional view schematically showing the configuration of the image recording device 3.

Described next is an image recording device provided with a single photoreceptor 20, charge unit 30, exposure unit 40, and electric-field generation unit 50; and having a configuration in which the electronic paper 100 is circulated by the conveyance unit 60. FIG. 24 is a schematic view showing the configuration of the image recording device 3.

The image recording device 3 for electronic paper has a charge unit 30, exposure unit 40, and electric-field generation unit 50 along the rotational direction of the photoreceptor 20 in the same manner as the image recording devices 1, 1A, 1B, as shown in FIG. 24; and furthermore has a conveyance unit 60 for feeding the electronic paper 100 twice to the same location as the photoreceptor 20 and the opposing roller 52, and a controller 80 (see FIG. 4) for controlling these units and the like, and operations of the image recording device 3 for electronic paper.

The electronic paper 100 as a medium for recording an image and used in the image recording device 3 has the same configuration and function as the electronic paper 100 used in the image recording devices 1, 1A, 1B.

The photoreceptor 20 has the same configuration and function as the photoreceptor 20 used in the image recording devices 1, 1A, 1B.

The charge unit 30 is the same as the charge roller 31 of the image recording devices 1, 1A, 1B. The charge unit 30 charges the photoreceptor 20 to −500 V (corresponding to the "first potential") in the first process. The charge unit 30 also charges the photoreceptor 20 to −500 V (corresponding to the "second potential") in the second process.

The exposure unit 40 has the same configuration and function as the exposure unit 40 used in the image recording devices 1, 1A, 1B.

The electric-field generation unit 50 is provided with a opposing roller 52 and a voltage-applying section 54 (FIG. 4), and has the same configuration and function as the electric-field generation unit 50 used in the image recording devices 1, 1A, 1B The conveyance unit 60 is used for conveying the electronic paper 100. The conveyance unit 60 has a paper cassette 62, a paper feed roller 64 positioned above the paper cassette 62, a conveyance roller 66 positioned on the photoreceptor 20 side of the configuration as viewed from the paper feed roller 64, a guide part (not shown), and a paper discharge roller (not shown). The paper feed roller 64 feeds electronic paper 100 stored in the paper cassette 62. The conveyance roller 66 conveys electronic paper 100 fed by the paper feed roller 64 into the gap between the photoreceptor 20 and the opposing roller 52. The electronic paper 100, which has undergone the first process carried out by the electric-field generation unit 50, is guided by the guide part in the conveyance direction indicated by the arrow Q and is again conveyed by the conveyance roller 66 to the gap between the photoreceptor 20 and the opposing roller 52. The electronic paper 100, which has undergone the second process carried out by the electric-field generation unit 50, is guided by the guide part in the conveyance direction indicated by the arrow P and discharged by the discharge roller from the image recording device 3.

The controller 80 has the same configuration and function as the controller 80 used in the image recording devices 1, 1A, 18

Operation of the Image Recording Device 3

Figure 25:
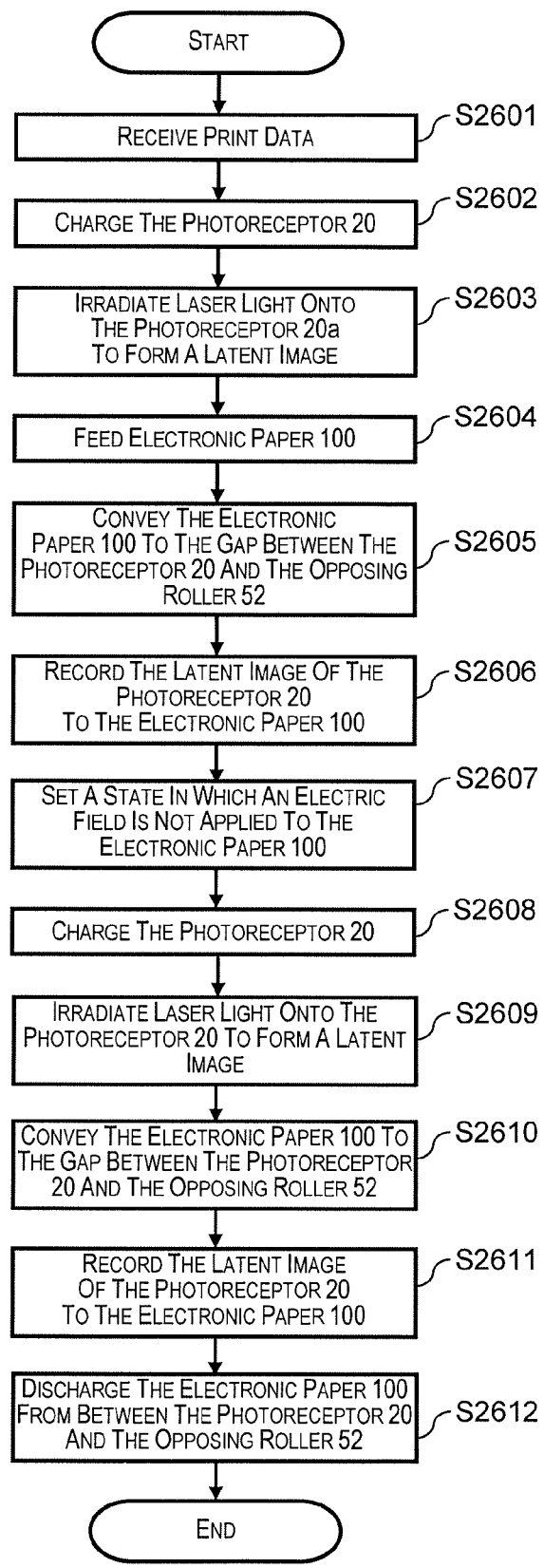
FIG. 25 is a flowchart showing the processing flow for recording an image carried out by the image recording device 3.

Next, the process in which the image recording device 3 records an image on electronic paper 100 will be described. FIG. 25 is a flowchart showing the processing flow for recording an image as carried out by the image recording device 3.

First, the controller 80 of the image recording device 3 receives print data from an external computer (S2601), whereupon the photoreceptor 20 is charged by the charge unit 30 to −500 V (S2602). The controller 80 causes laser light to be irradiated from the exposure unit 40 onto the photoreceptor 20 charged to −500 V on the basis of the print data to form a latent image on the photoreceptor 20 (S2603). In other words, a latent image is formed on the exposure unit 40 by forming a portion charged to −500 V (corresponding to the "first potential") without irradiation of laser light, and a portion set to −50 V (corresponding to the "second potential") by irradiation of laser light.

The controller 80 causes the conveyance unit 60 to feed the electronic paper 100 stored in the paper cassette 62 (S2604) and to convey the electronic paper to the gap between the photoreceptor 20 and the opposing roller 52 in sequential fashion from the front end location to the terminal end location (S2605). The controller 80 causes the voltage-applying section 54 to apply voltage that varies together with time to the opposing roller 52 to cause an electric field to be generated in the gap between the photoreceptor 20 and the opposing roller 52, cause the front end location to the terminal end location of the electronic paper 100 to be sequentially sandwiched therebetween and have an electric field applied, and cause an image that corresponds to the latent image of the photoreceptor 20 to be sequentially recorded from the front end location to the terminal end location of the electronic paper 100 (S2606). Steps S2601 to S2606 described above correspond to the first process.

The controller 80 causes the photoreceptor 20 and the opposing roller 52 to rotate to sequentially discharge the electronic paper 100 beginning from the front end location to the terminal end location from the gap between the photoreceptor 20 and the opposing roller 52 (S2607). In other words, the electronic paper 100 is discharged from the gap between the photoreceptor 20 and the opposing roller 52 in sequential fashion from the front end location to the terminal end location to form a state in the electronic paper 100 in which an electric field, which is produced by the difference in potential between the photoreceptor 20 and the opposing roller 52, is substantially absent. When the electronic paper 100 is to be conveyed, the controller 80 controls the guide part so that the electronic paper 100 is conveyed in the direction indicated by the arrow Q shown in FIG. 24.

The electronic paper 100 thus conveyed in the direction of the arrow Q is conveyed by the conveyance unit 60 so as to again pass between the photoreceptor 20 and the opposing roller 52.

The controller 80 causes photoreceptor 20 to be charged to −500 V by the charge unit 30 (S2608). The controller 80 causes laser light to be irradiated from the exposure unit 40 onto the photoreceptor 20 thus charged to −500 V on the basis of the print data to form a latent image on the photoreceptor 20 (S2609). In other words, a latent image is formed on the photoreceptor 20 by forming a portion charged to −500 V without irradiation of laser light and a portion set to −50 V by irradiation of laser light.

The controller 80 causes the electronic paper 100 to again be conveyed by the conveyance unit 60 into the gap between the photoreceptor 20 and the opposing roller 52 in sequential fashion from the front end location to the terminal end location (S2610). The controller 80 causes voltage that varies together with time to be applied by the voltage-applying section 54 to the opposing roller 52 to cause an electric field to be generated in the gap between the photoreceptor 20 and the opposing roller 52, causes the front end location to the terminal end location of the electronic paper 100 to be sequentially sandwiched therebetween and have an electric field applied, and causes an image that corresponds to the latent image of the photoreceptor 20 to be sequentially recorded from the front end location to the terminal end location of the electronic paper 100 (S2611).

The controller 80 causes the photoreceptor 20 and the opposing roller 52 to rotate to sequentially discharge the electronic paper 100 beginning from the front end location to the terminal end location from the gap between the photoreceptor 20 and the opposing roller 52 (S2612). When the electronic paper 100 is to be conveyed, the controller 80 controls the guide part so that the electronic paper 100 is conveyed in the direction indicated by the arrow P shown in FIG. 24. The electronic paper 100 thus conveyed in the direction of the arrow P is discharged to the exterior of the image recording device 3 for electronic paper. The steps S2607 to S2612 described above correspond to the second process.

Usefulness of the Image Recording Device 3

In accordance with the image recording device 3 for electronic paper, the voltage-applying section 54 is caused to carry out a first process in which the electronic paper 100 is conveyed by the conveyance unit 60, mutually different locations of the electronic paper 100 are sequentially fed into the gap between the photoreceptor 20 and the opposing roller 52, and an image corresponding to the latent image of the photoreceptor 20 is sequentially displayed in locations on the electronic paper 100 thus fed into the gap. The voltage-applying section 54 is caused to carry out a second process in which the electronic paper 100 is further conveyed by the conveyance unit 60, the locations of the electronic paper 100 having just come out from the gap between the photoreceptor 20 and the opposing roller 52 are again sequentially fed to the gap between the photoreceptor 20 and the opposing roller 52, and the image corresponding to the latent image in the locations fed to the gap is again sequentially displayed. The quality of an image recorded on the electronic paper 100 can thereby be improved. In other words, the quality of an image recorded on the electronic paper 100 can be improved in the same manner as embodiments 1 to 7 by again recording the image on the electronic paper 100 using a photoreceptor 20 and opposing roller 52 as a single set. In this case, the voltage-applying section 54 controls the voltage so that the value of the voltage is a fixed value when the first process is carried out, and varies the value of the voltage together with time when the second process is carried out.

Embodiment 9

Figure 26:
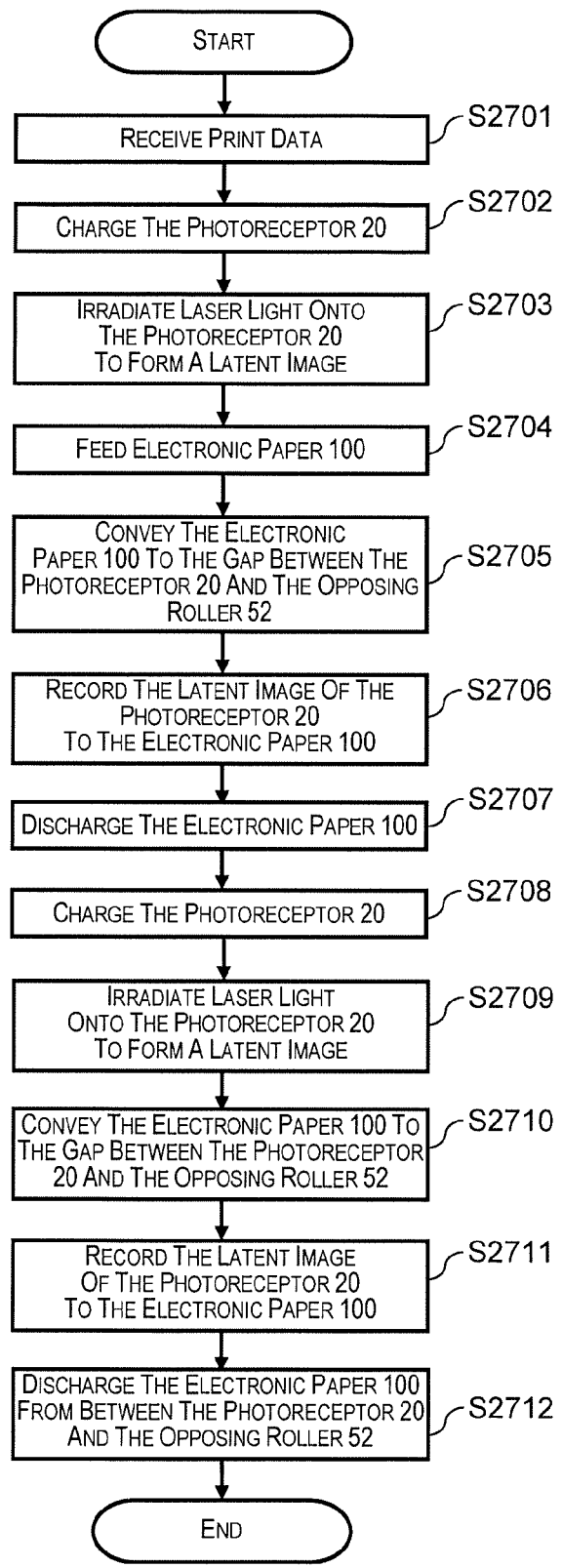
FIG. 26 is a flowchart showing the processing flow for recording an image carried out by the image recording device 3A.

An image recording device 3A (not shown) for recording an image onto electronic paper 100 as a medium for displaying an image will be described in embodiment 9 below. FIG. 26 is a flowchart showing the processing flow for recording an image carried out by the image recording device 3A. In the image recording device 3 of embodiments 8, the value of the voltage is kept at a fixed value when the first process is carried out, and the value of the voltage is varied together with time when the second process is carried out, but the image recording device 3A in embodiment 9 differs in that the specification of voltage control is different. The configuration of the image recording device 3A is the same as the image recording device 3.

Operation of the Image Recording Device 3A

The process in which the image recording device 3A records an image on electronic paper 100 will now be described. First, the controller 80 of the image recording device 3A receives print data from an external computer (S2701), whereupon the photoreceptor 20 is charged by the charge unit 30 to −500 V (S2702). The controller 80 causes laser light to be irradiated from the exposure unit 40 onto the photoreceptor 20 charged to −500 V on the basis of the print data to form a latent image on the photoreceptor 20 (S2703). In other words, a latent image is formed on the exposure unit 40 by forming a portion charged to −500 V (corresponding to the "first potential") without laser light irradiation, and a portion set to −50 V (corresponding to the "second potential") by laser light irradiation.

The controller 80 causes the conveyance unit 60 to feed the electronic paper 100 stored in the paper cassette 62 (S2704) and to convey the electronic paper to the gap between the photoreceptor 20 and the opposing roller 52 in sequential fashion from the front end location to the terminal end location (S2705). The controller 80 causes the voltage-applying section 54 to apply voltage that varies together with time to the opposing roller 52 to cause an electric field to be generated in the gap between the photoreceptor 20 and the opposing roller 52, cause the front end location to the terminal end location of the electronic paper 100 to be sequentially sandwiched therebetween and have an electric field applied, and cause an image that corresponds to the latent image of the photoreceptor 20 to be sequentially recorded from the front end location to the terminal end location of the electronic paper 100 (S2706). Steps S2701 to S2706 described above correspond to the first process.

The controller 80 causes the photoreceptor 20 and the opposing roller 52 to rotate to sequentially discharge the electronic paper 100 beginning from the front end location to the terminal end location from the gap between the photoreceptor 20 and the opposing roller 52 (S2707). When the electronic paper 100 is to be conveyed, the controller 80 controls the guide part so that the electronic paper 100 is conveyed in the direction indicated by the arrow Q shown in FIG. 24. The electronic paper 100 thus conveyed in the direction of the arrow Q is conveyed by the conveyance unit 60 so as to again pass between the photoreceptor 20 and the opposing roller 52.

The controller 80 causes the photoreceptor 20 to be charged to −500 V by the charge unit 30 (S2708). The controller 80 causes laser light to be irradiated from the exposure unit 40 onto the photoreceptor 20 thus charged to −500 V on the basis of the print data to form a latent image on the photoreceptor 20 (S2709). In other words, a latent image is formed on the photoreceptor 20 by forming a portion charged to −500 V without irradiation of laser light and a portion set to −50 V by irradiation of laser light.

The controller 80 causes the electronic paper 100 to again be conveyed by the conveyance unit 60 into the gap between the photoreceptor 20 and the opposing roller 52 in sequential fashion from the front end location to the terminal end location (S2710). The controller 80 causes fixed voltage to be applied by the voltage-applying section 54 to the opposing roller 52 to thereby cause an electric field to be generated in the gap between the photoreceptor 20 and the opposing roller 52, causes the front end location to the terminal end location of the electronic paper 100 to be sequentially sandwiched therebetween and have an electric field applied, and causes an image that corresponds to the latent image of the photoreceptor 20 to be sequentially recorded from the front end location to the terminal end location of the electronic paper 100 (S2711).

The controller 80 causes the photoreceptor 20 and the opposing roller 52 to rotate to sequentially discharge the electronic paper 100 beginning from the front end location to the terminal end location from the gap between the photoreceptor 20 and the opposing roller 52 (S2712). When the electronic paper 100 is to be discharged, the controller 80 controls the guide part so that the electronic paper 100 is conveyed in the direction indicated by the arrow P shown in FIG. 24. The electronic paper 100 thus conveyed in the direction of the arrow P is discharged to the exterior of the image recording device 3A for electronic paper. The steps S2707 to S2712 described above correspond to the second process.

Usefulness of the Image Recording Device 3A

In accordance with the image recording device 3A for electronic paper of the present embodiment, the voltage-applying section 54 is caused to carry out a first process in which the electronic paper 100 is conveyed by the conveyance unit 60, mutually different locations of the electronic paper 100 are sequentially fed into the gap between the photoreceptor 20 and the opposing roller 52, and an image corresponding to the latent image of the photoreceptor 20 is sequentially displayed in locations on the electronic paper 100 thus fed into the gap. The voltage-applying section 54 is caused to carry out a second process in which the electronic paper 100 is further conveyed by the conveyance unit 60, the locations of the electronic paper 100 temporarily departed from the gap between the photoreceptor 20 and the opposing roller 52 are again sequentially fed to the gap between the photoreceptor 20 and the opposing roller 52, and the image corresponding to the latent image in the locations fed to the gap is again sequentially displayed. In accordance with the image recording device 2 for electronic paper, the quality of an image recorded on the electronic paper can be improved by controlling the voltage applied to the opposing member so that the value of the voltage varies together with time and so that the value of the voltage becomes a value that is less than the first potential at a minimum value and becomes a value that is greater than the second potential at a maximum value when the first process is carried out; and by controlling the value of the voltage so that the value of the voltage is a fixed value in a range greater than the first potential and less than the second potential when the second process is carried out. In other words, the intensity of the electric field is varied to cause the magnitude of the force to vary while changing the direction of the force applied to the charged color particles in the thickness direction when the first process is carried out, whereby the image can be recorded while reducing the obstruction of the movement of a portion of the charged color particles by other charged color particles. A sharper image can thereby be displayed on the electronic paper.

Embodiments 1 to 9 are not be interpreted as limiting the invention, and embodiments that include the following modifications are also included in the invention.

Electronic Paper

In embodiments 1 to 9 described above, positively charged white particles and negatively charged black particles were used as an example of charged color particles in the electronic paper 100, but no limitation is imposed thereby.

For example, the white particles may have a negative charge and the black particles may have a positive charge. The colors are not limited to white and black, and as long as both colors are different colors, any colors may be used. For example, red, blue, green, and other chromatic colors may be used; and it is also possible to suitably select colors in accordance with the intended purpose from among gold, silver, and other colors with a metal luster. Also possible are cases in which only one of the two color particles is charged and the other is not charged (uncharged; e.g., a case in which only negatively charged black particles are present as the charged color particles because the white particles are uncharged), and the invention can be applied to such cases as well.

The upper insulating layer 141 of the electronic paper 100 has optical transparency (is substantially transparent) and the lower insulating layer 142 conversely does not have optical transparency (is substantially opaque), but no limitation is imposed thereby. For example, both the upper insulating layer 141 and the lower insulating layer 142 may have optical transparency (be substantially transparent), and in this case, either of the upper insulating layer 141 and the lower insulating layer 142 can used as a display surface 121.

Image Recording Device

The image recording devices 1, 1A, 1B, 2, 2A, 2B, 2C, 3, 3A are configured so that the electric potential is reduced when the region irradiated with laser loses positive charge in the case that, e.g., the photoreceptor 20 has been given a positive charge by the charge roller 31. A latent image is thus formed on the photoreceptor 20 even in the case that the photoreceptor 20 has been given a positive charge.

In the case that the image recording devices 1, 1A, 1B, 2, 2A, 2B, 2C, 3, 3A are used as an image recording and erasing device provided with a function for recording images to and erasing images from the electronic paper 100, it is also possible to use a configuration in which a liquid crystal panel as an example of an operation panel is provided, and the image recording mode and the image erasing mode are switched in accordance with operation input from an operator.

What is claimed is:

1. A device for recording an image onto electronic paper, comprising:
    an image support body that supports a latent image, the image support body including a photoreceptor, the image support body configured to form the latent image by irradiating laser light to the photoreceptor;
    an opposing member that faces the image support body;
    a supply section that supplies electronic paper in a gap between the image support body and the opposing member, the electronic paper having charged color particles and being used for displaying an image as a result of the charged color particles migrating in a thickness direction;
    a voltage-applying section that applies a voltage to the opposing member, where an electric field is generated along the thickness direction in the gap, and the charged color particles are caused to migrate in the thickness direction, where an image corresponding to the latent image is displayed on the electronic paper; and
    a voltage control section that controls the voltage applied to the opposing member so that the value of the voltage varies together with time.

2. The device for recording an image onto electronic paper according to claim 1, wherein
    the voltage control section controls the voltage so that the value of the voltage varies within a range of V1 or higher and V2 or lower, wherein V1 is the smaller and V2 is the larger of the potential in the image part of the latent image and the potential in the non-image part.

3. The device for recording an image onto electronic paper according to claim 2, characterized in that the voltage control section controls the voltage so that the value of the voltage is V1 or V2.

4. The device for recording an image onto electronic paper according to claim 1, wherein
    the supply section supplies to the gap the electronic paper on which an image is displayed,
    the voltage-applying section applies a voltage to the opposing member where an electric field is generated along the thickness direction in the gap, and causes the charged color particles to migrate in the thickness direction to erase the image displayed on the electronic paper supplied to the gap by the supply section, and
    the voltage control unit controls the voltage so that the value of the voltage varies so as to include values that are V1 or higher and V2 or lower, and at least a set of values that is greater than V2 or a set of values that is less than VI, wherein V1 is the smaller and V2 is the larger of the potential in the image part of the latent image and the potential in the non-image part.

5. A method for recording an image on electronic paper, comprising:
    supplying electronic paper in a gap between an image support body that supports a latent image and an opposing member facing the image support body, the electronic paper having charged color particles and being used for displaying an image as a result of charged color particles migrating in a thickness direction, the image support body including a photoreceptor;
    irradiating laser light to the photoreceptor in order to for the latent image; and
    displaying an image that corresponds to the latent image on the electronic paper by applying voltage to the opposing member, controlling the voltage applied to the opposing member so that the value of the voltage varies together with time, generating an electric field in the gap along the thickness direction, and causing the charged color particles to move in the thickness direction.

6. A device for recording an image onto electronic paper, comprising:
    an image support body that supports a latent image, the image support body including a photoreceptor, the image support body configured to form the latent image by irradiating laser light to the photoreceptor;
    an opposing member that faces the image support body;
    a conveyance member that conveys electronic paper that has charged color particles and that displays an image as a result of the charged color particles migrating in a thickness direction;
    a voltage-applying section that applies voltage to the opposing member when the electronic paper is positioned between the image support body and the opposing member, where an electric field is generated along the thickness direction in the gap, and the charged color particles are caused to move in the thickness direction, where an image corresponding to the latent image is displayed on the electronic paper; and
    a controller that causes the voltage-applying section to carry out a first process for causing the electronic paper to be conveyed to the conveyance member, causes mutually different locations of the electronic paper to be sequentially fed to the gap, causes an image corresponding to the latent image to be sequentially displayed in the location fed to the gap, causes the voltage-applying section to carry out a second process for causing the electronic paper to be conveyed to the conveyance member, causes the locations having just come out from the gap to again be sequentially fed to the gap, and causes the image corresponding to the latent image in the location fed to the gap to again be sequentially displayed, wherein
    the controller controls the voltage applied to the opposing member so that the value of the voltage is a constant value when the first process has been carried out, and controls the voltage so that the value of the voltage varies together with time when the second process is carried out.

7. The device for recording an image onto electronic paper according to claim 6, wherein the image support body supports a latent image by having a region charged at a first potential and a region charged at a second potential that is greater that the first potential, and the controller controls the voltage applied to the opposing member so that the value of the voltage is a fixed value in a range that is greater than the first potential and less than the second potential when the first process is carried out, and controls the voltage so that the value of the voltage varies together with time in a range that is greater than the first potential and less than the second potential when the second process is carried out.

8. The device for recording an image onto electronic paper according to claim 6, wherein the image support body supports a latent image by having a region charged at a first potential and a region charged at a second potential that is greater that the first potential, and the controller controls the voltage applied to the opposing member so that the value of the voltage is a fixed value in a range that is greater than the first potential and less than the second potential when the first process is carried out, and controls the voltage so that the value of the voltage varies together with time, and so that the value of the voltage becomes a value that is less than the first potential at a minimum value and becomes a value that is greater than the second potential at a maximum value when the second process is carried out.

* * * * *